United States Patent
Grossman et al.

(10) Patent No.: US 7,577,974 B2
(45) Date of Patent: *Aug. 18, 2009

(54) MOVIES CHANNEL

(75) Inventors: Joel K. Grossman, Seattle, WA (US); Albert W. Tan, Redmond, WA (US); Kent Hayden Skinner, Kirkland, WA (US); Pierre-Francois Seri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1101 days.

This patent is subject to a terminal disclaimer.

(21) Appl. No.: 10/856,474

(22) Filed: May 28, 2004

(65) Prior Publication Data

US 2005/0278750 A1    Dec. 15, 2005

(51) Int. Cl.
*H04N 7/16* (2006.01)
*H04N 7/18* (2006.01)
*H04N 7/025* (2006.01)
*H04N 7/173* (2006.01)
*H04N 60/33* (2006.01)
*H04B 1/06* (2006.01)
*H04M 1/00* (2006.01)
*G01S 5/02* (2006.01)

(52) U.S. Cl. .............. 725/62; 725/9; 725/28; 725/45; 725/46; 725/75; 725/82; 725/87; 725/98; 725/135; 725/136; 725/148; 342/357.11; 455/266; 455/456; 455/550.1; 455/566

(58) Field of Classification Search ......... 725/62, 725/9, 28, 45, 46, 75, 82, 87, 97, 98, 135, 725/136, 148; 342/357.11; 348/E5.008, 348/E7.073; 455/266, 456.3, 550.1, 566
See application file for complete search history.

(56) References Cited

U.S. PATENT DOCUMENTS

| | | | |
|---|---|---|---|
| 5,440,632 A | 8/1995 | Bacon et al. | 380/20 |
| 5,442,646 A | 8/1995 | Chadwick et al. | 714/795 |
| 5,793,301 A | 8/1998 | Patterson, Jr. et al. | 340/825.26 |
| 5,854,985 A | 12/1998 | Sainton et al. | 455/553.1 |
| 6,014,606 A | 1/2000 | Tu | 701/200 |

(Continued)

FOREIGN PATENT DOCUMENTS

WO    WO 99/35778    7/1999

OTHER PUBLICATIONS

D. Burke, "The FM Wristwatch Radio", http://www.nvg.ntnu.no/Sinclair/radiowat.htm, last accessed Jul. 11, 2001, 1 page.
S. Reedy, "Sinclair Watch Radio", http://www.somerset.net/arm/transistors/Sinclair.html, last accessed Jul. 11, 2001, 4 pages.
Ambient Devices, http://www.ambientdevices.com/cat/platform.html, last accessed Sep. 5, 2002, 2 pages.
Ambient Devices, http://www.ambientdevices.com/cat/applications.html, last accessed Sep. 5, 2002, 3 pages.

(Continued)

*Primary Examiner*—Thai Tran
*Assistant Examiner*—Syed Y Hasan
(74) *Attorney, Agent, or Firm*—Merchant & Gould, P.C.

(57) ABSTRACT

The present invention provides a movie channel to a user on a mobile device. Movie based content associated with a movie channel is automatically delivered and stored on a mobile electronic device for access by a user. Using the device, users can quickly and efficiently access movie information without having to type in information, or specifically request the movie information to be downloaded to the device. The movie channel includes several different modes for categorically displaying different types of movie information. Some example modes include: a movies mode; a theaters mode; and a current top movies mode. The movies mode is organized to display information relating to particular movies on the electronic device. The theaters mode is arranged to display information relating to particular theaters on the electronic device. The current top movies mode displays information relating to the current "hot" movies.

36 Claims, 14 Drawing Sheets

U.S. PATENT DOCUMENTS

| | | | |
|---|---|---|---|
| 6,212,414 B1 | 4/2001 | Alameh et al. | 455/575.6 |
| 6,272,332 B1* | 8/2001 | Matsumoto et al. | 455/412.1 |
| 6,363,419 B1 | 3/2002 | Martin, Jr. et al. | 709/219 |
| 6,373,374 B1 | 4/2002 | Siemens | 340/309.8 |
| 6,389,473 B1 | 5/2002 | Carmel et al. | 709/231 |
| 6,480,783 B1 | 11/2002 | Myr | 701/117 |
| 6,522,875 B1 | 2/2003 | Dowling et al. | 455/414 |
| 6,564,381 B1* | 5/2003 | Hodge et al. | 725/97 |
| 6,618,593 B1* | 9/2003 | Drutman et al. | 455/456.3 |
| 6,703,930 B2 | 3/2004 | Skinner | 340/539.11 |
| 6,714,486 B2 | 3/2004 | Biggs | 368/82 |
| 6,853,911 B1 | 2/2005 | Sakarya | 701/208 |
| 6,879,847 B1 | 4/2005 | Kato et al. | 455/566 |
| 6,883,019 B1 | 4/2005 | Sengupta et al. | 709/206 |
| 6,931,198 B1* | 8/2005 | Hamada et al. | 386/46 |
| 6,973,318 B2 | 12/2005 | Jambhekar et al. | 455/456.1 |
| 7,017,105 B2 | 3/2006 | Flanagin et al. | 714/798 |
| 7,079,452 B2 | 7/2006 | Harrison | 368/82 |
| 7,092,703 B1 | 8/2006 | Papineau | 455/418 |
| 7,113,981 B2 | 9/2006 | Slate | 709/217 |
| 7,287,097 B1 | 10/2007 | Friend et al. | 709/248 |
| 2001/0056578 A1* | 12/2001 | Hwang et al. | 725/98 |
| 2002/0012010 A1 | 1/2002 | Pasquali | 345/719 |
| 2002/0018643 A1* | 2/2002 | Okada et al. | 386/95 |
| 2002/0032755 A1 | 3/2002 | Abrahams et al. | 709/219 |
| 2002/0058520 A1 | 5/2002 | Nakagawa | 455/456 |
| 2002/0090934 A1 | 7/2002 | Mitchelmore | 455/412 |
| 2002/0095458 A1* | 7/2002 | Silverstein et al. | 709/203 |
| 2002/0099452 A1 | 7/2002 | Kawai | 700/16 |
| 2002/0128000 A1* | 9/2002 | do Nascimento, Jr. | 455/414 |
| 2002/0142268 A1 | 10/2002 | Dutta et al. | 434/106 |
| 2002/0160805 A1* | 10/2002 | Laitinen et al. | 455/550 |
| 2003/0007012 A1* | 1/2003 | Bate | 345/825 |
| 2003/0028451 A1* | 2/2003 | Ananian | 705/27 |
| 2003/0046291 A1 | 3/2003 | Fascenda | 707/10 |
| 2003/0058352 A1* | 3/2003 | Nishijima et al. | 348/231.1 |
| 2003/0069029 A1 | 4/2003 | Dowling et al. | 455/456 |
| 2003/0130898 A1 | 7/2003 | Pickover et al. | 705/26 |
| 2003/0130926 A1 | 7/2003 | Moore et al. | 705/37 |
| 2003/0228910 A1 | 12/2003 | Jawaharlal et al. | 463/42 |
| 2004/0021555 A1 | 2/2004 | Faris | 340/7.52 |
| 2004/0043760 A1 | 3/2004 | Rosenfeld et al. | 455/413.3 |
| 2004/0135671 A1 | 7/2004 | Khoshbin et al. | 370/7.53 |
| 2004/0181819 A1* | 9/2004 | Theiste et al. | 725/146 |
| 2004/0203674 A1 | 10/2004 | Shi et al. | 455/415 |
| 2004/0204143 A1 | 10/2004 | Chen | 455/566 |
| 2004/0224662 A1 | 11/2004 | O'Neil et al. | 455/408 |
| 2005/0027676 A1 | 2/2005 | Eichstaedt et al. | 707/1 |
| 2005/0186940 A1 | 8/2005 | Schatzberger et al. | 455/406 |
| 2005/0188078 A1 | 8/2005 | Kotzin et al. | 709/224 |
| 2005/0221821 A1 | 10/2005 | Sokola et al. | 455/432.3 |
| 2005/0245243 A1 | 11/2005 | Zuniga | 455/414.3 |
| 2005/0256797 A1 | 11/2005 | Tyulyaev | 705/37 |
| 2006/0063567 A1 | 3/2006 | Grossman et al. | 455/566 |

OTHER PUBLICATIONS

E. Mueller, "A Calendar with Common Sense", ACM 2000, pp. 198-201.

B. Azvine et al., "The Intelligent Assistant: An Overview", Intelligent Systems and Soft Computing, LNAI 1804, Springer-Verlag, 2000, pp. 215-238.

T. Payne et al., "Calendar Agents on the Semantic Web", IEEE Intelligent Systems, May-Jun. 2002, 5 pgs.

S. Nylander et al., "Providing Device Independence to Mobile Services", User Interfaces for All, LNCS 2615, Springer-Verlag, 2003, pp. 465-473.

M.T. Raghunath et al., "User Interfaces for Applications on a Wrist Watch", Springer-Verlag, Personal and Ubiquitous Computing, vol. 6, 2002, pp. 17-30.

S. Mann, "'Smart Clothing': Wearable Multimedia Computing and 'Personal Imagining' to Restore the Technological Balance Between People and Their Environments", ACM Multimedia, 1996, pp. 163-174.

S. Barnes et al., "Rising Sun: iMode and the Wireless Internet", Communications of the ACM, vol. 46, No. 11, Nov. 2003, pp. 79-84.

A. Adya et al., "Characterizing Alert and Browse Services for Mobile Clients", Microsoft Research, 14 pages.

S. Acharya et al., "Balancing Push and Pull for data Broadcast", Proceedings of ACM SIGMOD Conference, May 1997, pp. 1-12.

A. Carzaniga et al., "Content-Based Networking: A New Communication Infrastructure", Dept. of Computer Science, University of Colorado, 9 pages.

P. Tarasewich et al., "Issues in Wireless E-Commerce", ACM, 5 pages.

C. H. Leung et al., "Analysis of Mobile Commerce Marketin Hong Kong", ACM, ICEC 2003, pp. 408-412.

G. Samaras et al., "Personalized Portals for the Wireless User Based on Mobile Agents", WMC '02, Sep. 28, 2002, pp. 70-74.

Timex—Data Link, http://www.timex.com/html/data_link.html, last accessed Sep. 8, 2004.

Traffic Gauge (tm) Mobile Traffic Map, http://www.trafficgauge.com/, last accessed Sep. 8, 2004, 2 pages.

ESPN.com, http://sports.espn.go.com/ncf/scoreboard, last accessed Dec. 16, 2004, 8 pages.

Free Daily Overview Horoscope, Astrology.com, http://horoscopes.astrology.com/dailysagittarious.html?arrivalSA=1&cobrandRef=0&arriv..., last accessed Dec. 16, 2004, 3 pages.

MSN Money—Financial Site, http://moneycentral.msn.com/home.asp, last accessed Dec. 16, 2004, 2 pages.

Yahoo Finance, http://finance.yahoo.com, last accessed Dec. 16, 2004, 3 pages.

AT&T Wireless, http://www.attwireless.com/personal/features/mmode/mmodeguide/content.jhtml, last accessed Dec. 16, 2004, 8 pages.

Moviefone: Who is +Mr. Moviefone, http://movies.channel.aol.com/franchise/reeldeal/mrmoviefonbio.adp, last accessed Dec. 16, 2004, 4 pages.

AvantGo, Inc., http://www.avantgo.com/frontdoor/learn_more.html, last accessed Dec. 16, 2004, 3 pages.

MSN Mobile, http://mobile.msn.com/ac.aspx?cid=uuhp_alerts, last accessed Dec. 16, 2004, 2 pages.

AccuWeather, http://www.accuweather.com/adcbin/public/index.asp?partner=accuweather, last accessed Dec. 16, 2004, 3 pages.

weather.com, http://www.weather.com/weather/local/98101?Iswe=98101&1wsa=WeatherLocalUndecla..., last accessed Dec. 16, 2004, 4 pages.

Yahoo! Mobile, http://mobile.yahoo.com/?nosplash=1, last accessed Dec. 16, 2004, 2 pages.

* cited by examiner

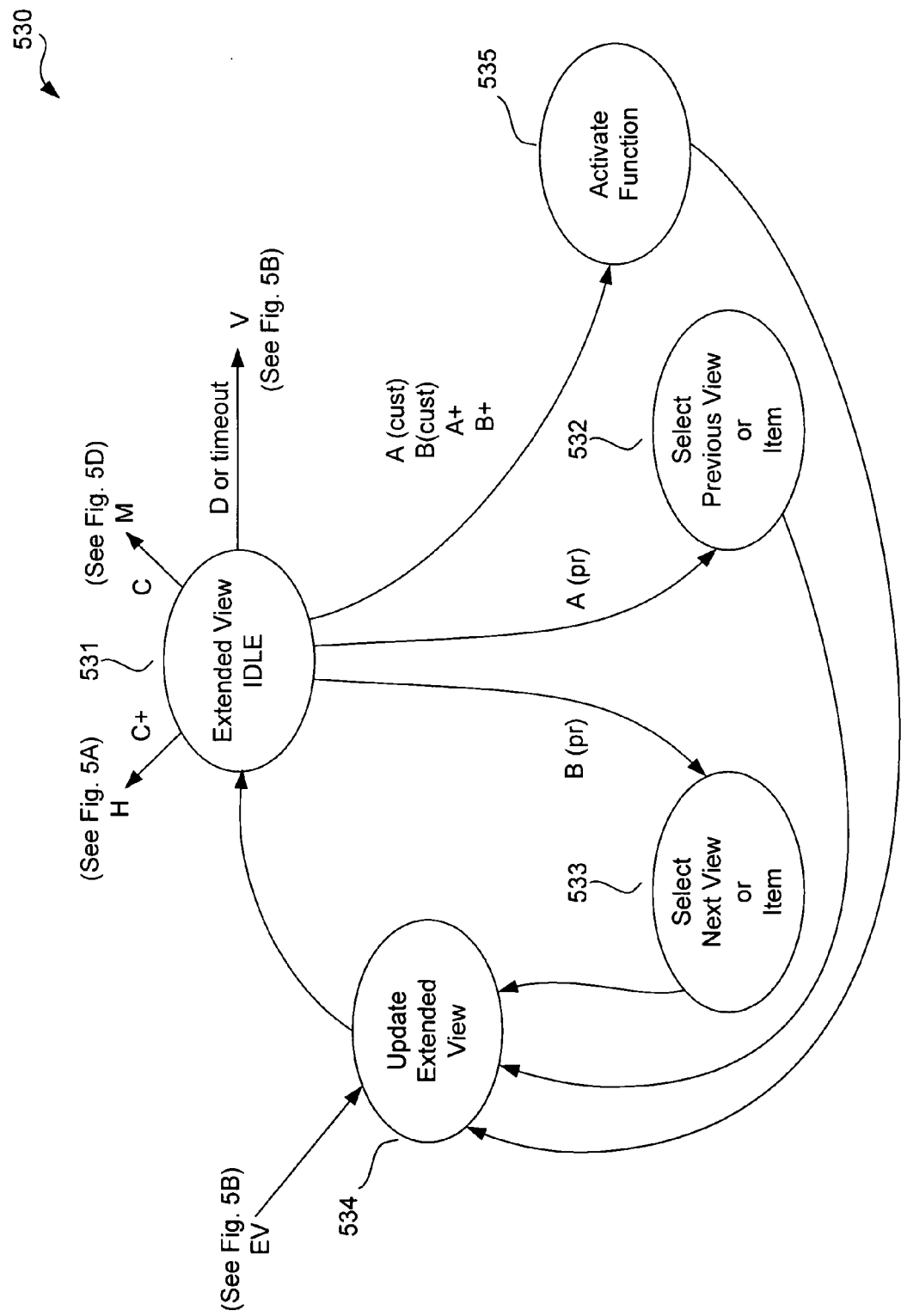

MOVIES CHANNEL

BACKGROUND OF THE INVENTION

Mobile electronic devices, such as cell phones, wireless PDAs, wireless laptops and other mobile communication devices are making impressive inroads with consumers. Many of the mobile electronic devices are able to perform a variety of tasks and include a user interface to help the user access the features associated with the device. For example, some mobile devices include a display unit that displays graphical data to support email, instant messaging, web browsing, and other non-voice features. Using their mobile devices, users access the Internet, send and receive email, participate in instant messaging, and perform other operations. Accessing the desired information, however, may be cumbersome for the user. When accessing the Internet, for instance, users have to log onto the network and then type in information to access the information they desire. Additionally, using the user interface on the mobile device may be difficult. For instance, mobile devices typically do not have a good mechanism for inputting data.

SUMMARY OF THE INVENTION

The present invention is directed at providing a movie channel to a user on a mobile device.

According to one aspect of the invention, movie based content associated with a movie channel is automatically delivered and stored on a mobile electronic device for access by a user. Using the device, users can quickly access movie information without having to type in information, or specifically request the movie information to be downloaded to the device. The movie channel is directed at providing a quicker and less cumbersome way of accessing movie information than having to access a web site or a telephone service.

According to another aspect of the invention, the movie channel includes several different modes for categorically displaying different types of movie information. Some example modes include: a movies mode; a theaters mode; and a current top movies mode. The movies mode is organized to display information relating to particular movies on the electronic device. The theaters mode is arranged to display information relating to particular theaters on the electronic device. The current top movies mode displays information relating to the current "hot" movies.

According to yet another aspect of the invention, the user may customize the movie information they receive. For example, the user may select a list of available theaters from their home area or work area.

According to still yet another aspect of the invention, when the user travels, the device may provide a list of theaters to them based on their location without the user having to configure their list of "favorite" theaters for the area in which they are traveling.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

FIGS. 5A-5D illustrate process flows for passive and active navigation functions of a electronic device.

DETAILED DESCRIPTION OF THE PREFERRED EMBODIMENT

The apparatus, system, and method of the present invention are related to navigating through a movie channel on a device that includes stored movie related information. Content that is associated with the movie channel may be selected and viewed on a display of the device by means of passive interaction (e.g., hands free operation) or active interaction (e.g., selecting buttons).

In the described embodiments, the electronic devices may be mobile devices, such as smart watches, that are specially configured to receive communication signals. The electronic devices may be configured to receive broadcast transmissions from one or more broadcast towers and are capable of receiving and processing messages from the broadcast transmissions. The electronic devices store the received information such that the information is indexed according to designated channels. Each channel includes content that is organized according to a set of criteria. For example, sports content is presented in one channel; wherein movie content is presented in another channel. Some channels may include content from one or more of the other channels. After information is received and processed by the client device, a user may passively or actively review the information that is stored in the electronic device.

One of the particular channels corresponds to a movies channel. The movies channel on each device may be customized based on user preferences such that the user experience is enhanced. An example movies channel may be configured to display information relating to certain theaters that a user has selected, are within a designated area, or are based on user movie genre preferences, ratings, and the like.

Although described here in the context of a watch-based system, other mobile or non-mobile devices, such as portable and desktop computers, personal digital assistants (PDAs), cellular telephones, and the like, may be used. The use of a watch is for illustrative purposes only to simplify the following discussion, and may be used interchangeably with "mobile device" and/or "electronic device".

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

Exemplary Smart Object Device

Figure 2:
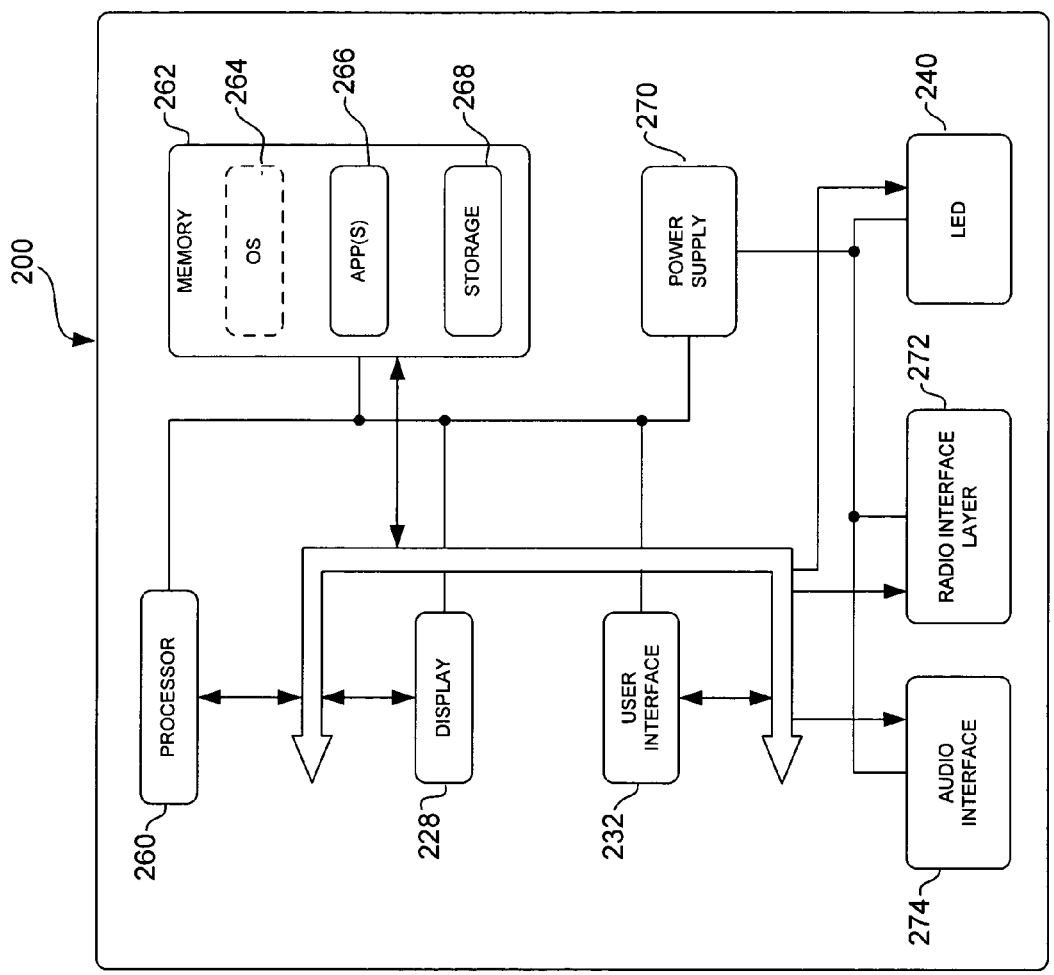
FIG. 2 shows an electronic device.
Figure 3:
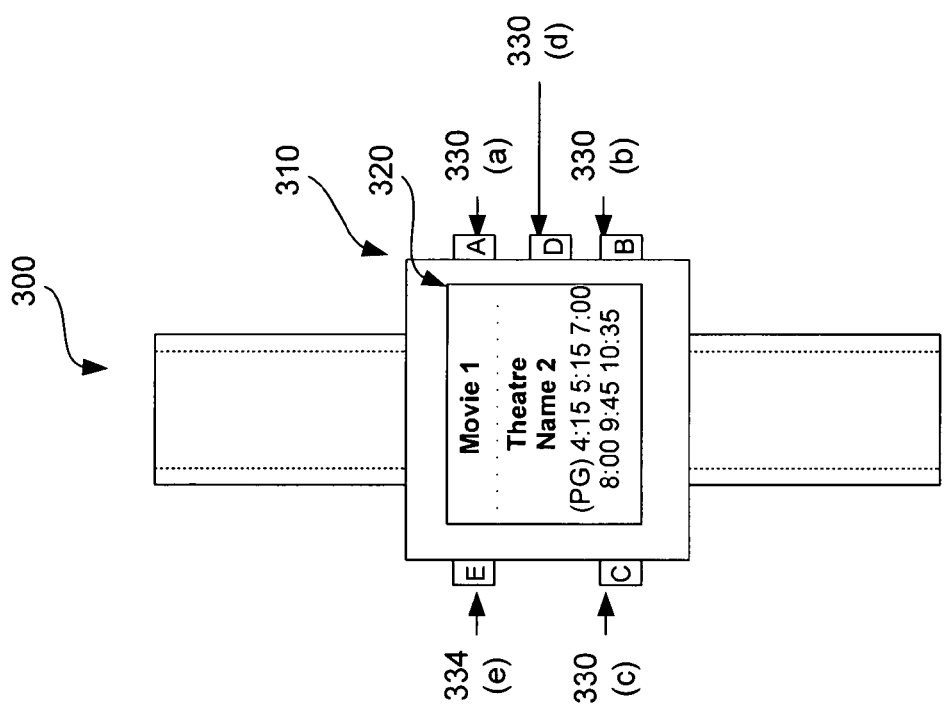
FIG. 3 illustrates an exemplary smart object watch devices that include a user interface for navigating through channels and content.

FIG. 3 illustrates an exemplary smart device that includes a user interface that is configured to interact with content from channels, in accordance with aspects of the invention. Watch device 300 includes bezel 310 which has an electronic system. The electronic system performs the functions in a manner that is consistent with the hardware that is described with respect to FIG. 2. Bezel 310 includes display 320, such as a liquid crystal display, a multiple bit display, or a full color display. In one embodiment, watch hands are electronically generated on display 320 when the user is in a time mode. In an alternative embodiment, the bezel includes analog-type watch hands that do not detrimentally interfere with display 320. As illustrated, display 320 shows movie times for a selected movie at a theater.

Watch device 300 includes a series of selectors, such as buttons A-D (330*a-d*), which are arranged to operate as part of a user interface (UI). Each selector may have a default function and/or a context determined function. The currently selected channel determines the context for each selector. Alternatively, the currently active display may determine the context for each selector. For example, a display screen (e.g., a help screen) may be superimposed on the main display such that the display screen becomes the active context. Watch device 300 is context sensitive in that the function that is associated with each selector may change based on the selected channel or display screen.

Button "A" has a default function of page up or previous page in the currently selected channel. Button "A" may also have an alternate function based on the currently selected channel or display. For example, button "A" may be configured to activate a speed list browse function after button "A" is activated for a predetermined time interval. In the speed list browse function, a pop-up visual cue (e.g., a pop-up window) may be used to indicate how that list is indexed. Each record (e.g., a list of movie theaters, a list of movies, etc.) can be indexed many different ways, including alphabetically, by date, categories, or any other way of indexing a record. List browse indexing allows a user to quickly access records located within the list.

Button "B" has a default function of page down or next page in the currently selected channel. Button "B" may also have an alternate function based on the currently selected channel or display. In one example, button "B" is activated for a predetermined time interval (e.g., two seconds) to select a "speed list browse" function.

Button "C" has a default function of next channel. Button "C" may also have an alternate function based on the currently selected channel or display. In one example, button "C" is activated for a predetermined time interval (e.g., two seconds) to select the main channel or "primary" channel. The main channel in an example watch device is the time channel that provides the user with time related information. However, devices may be configured to have some other display screen that is recognized by the device as a "primary" channel or "home" location.

Button "D" has a default (or "primary") function of "enter." The "enter" function is context sensitive and used to select the "enter" function within a selected channel (e.g., enter Theater View Mode), or to select an item from a selection list (e.g., select a movie within the movie view list browse). Button "D" may also have an alternate function based on the currently selected channel or display. For example, the "D" selector is activated for a predetermined time interval (e.g., two seconds) to activate a delete function. In another example, the "D" button may be selected for a predetermined time to activate a help screen or an additional set mode. In this example, the help screen remains active while button "D" is activated, and the help screen is deactivated (e.g., removed from the display) when the "D" button is released.

The selectors are arranged such that the electronic device accomplishes navigating and selecting content on each channel in a simple manner. An optional fifth selector (e.g., button "E") may be arranged to provide other functions such as backlighting or another desired function. Other selectors may also be included. For example, an optional sixth selector (not shown) may be arranged to operate as a "channel back" function such that navigation through channels may be accomplished in a forward and reverse direction.

Movie Channel

The movie channel is arranged to provide a user of a mobile electronic device simple access to movie information, such as movie schedules, theater information, and updates relating to items such as new movie releases, movie news, and current top movies. The movie theaters and related information may be customized for each electronic device based on user preferences. The user preferences and movie information may be provided as information that is retrieved from broadcast transmissions such as described herein.

Users are able to view current day movie times for movies playing at a list of selected theaters. According to one embodiment, the movie listing information includes the following information: movie name; category; theater name; address and phone; rating (G, PG, PG-13, R, NC-17, X); and show times. Movie review information may also be provided to the user. According to one embodiment, the review information includes: an editorial review rating, a user review rating, a full text description relating to the movie, primary actors/actresses, and the director.

Users may also personalize the movie information they receive. For example, a user may choose to view only those theaters that they frequently attend and/or users can also receive movie times for theaters in their immediate current vicinity. The user may also choose movies from a certain genre of movies, such as comedy, horror, and the like. The user may also personalize the moves based on the movie's ratings, such as G, PG, PG-13, R, NR, and the like.

While using the movie channel, users may select a movie by name, theater, current hot movies, and the like. Other items of movie information that may be delivered to the device include: information on upcoming movies; top rentals; movie news; movie trivia; movie awards; and the like.

Exemplary Modes

FIGS. 7-10 are diagrams illustrating example views for various modes associated with a movie channel that is arranged in accordance with the present invention.

Figure 7:
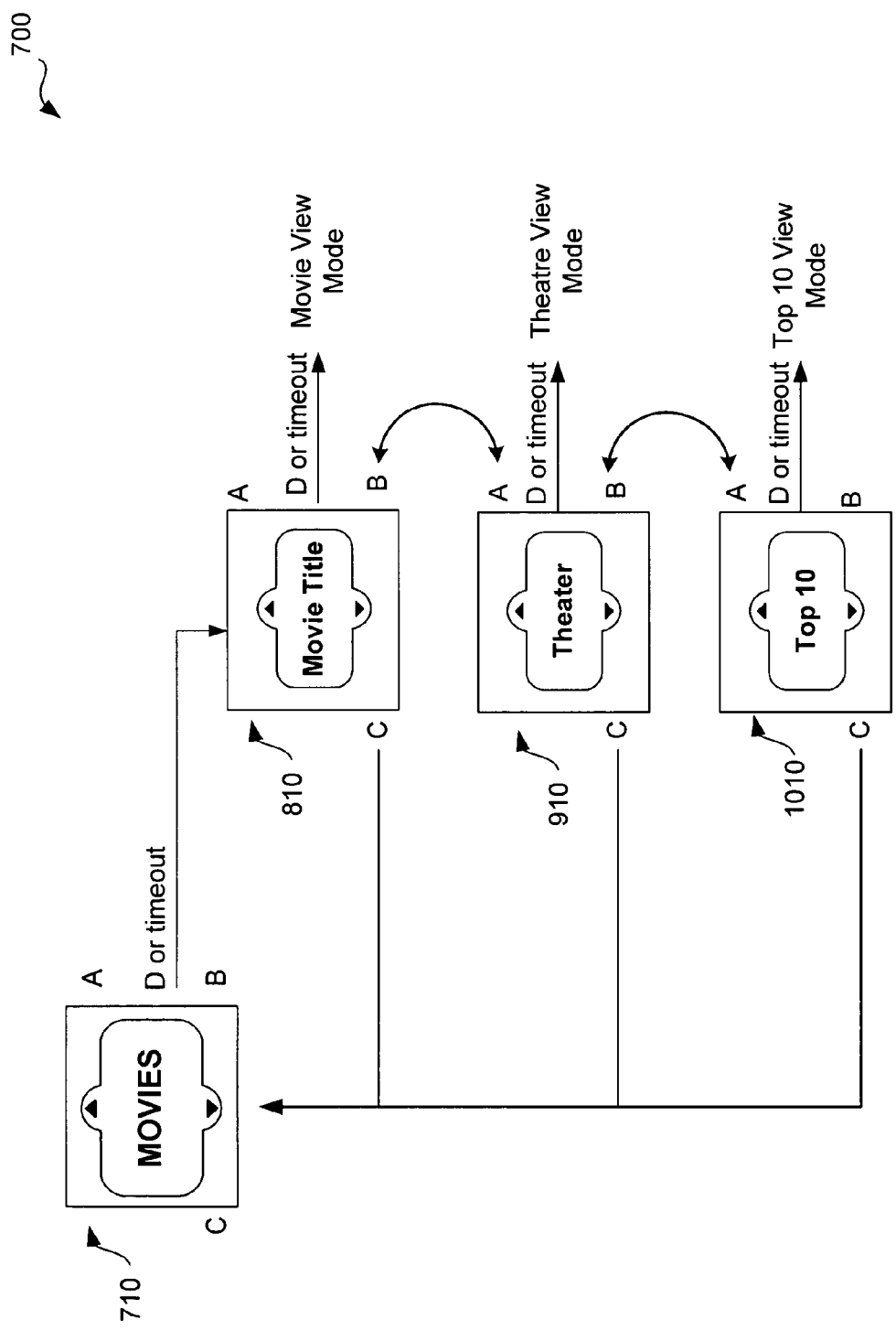
FIG. 7 illustrates exemplary modes for a movie channel.

FIG. 7 shows operating modes 700 associated with a movie channel, in accordance with aspects of the invention. The movie channel may be configured for multiple operating modes. According to one embodiment, the movie channel includes three modes: a movies mode (810), a theaters mode (910), and a top 10 mode (1010).

Movies channel splash-screen 710 is displayed when the movie channel is initially selected. After the movie channel is selected, one of the available modes is activated by the expiration of a timeout period (e.g., two seconds) without user interaction, or by activation of the "D" or "enter" selector. The channel splash can be activated from any one of the mode splash screens by activation of the "C" selector (See FIG. 3).

A mode splash-screen is displayed whenever the mode is changed on the device. In one example, the mode may be changed by selective activation of the next and previous selectors (e.g., the "B" and "A" buttons) when any mode splash screen is active. The mode splash screen may be dismissed via a timeout condition or by activation of the "D" selector (or enter function). Each mode has a series of associated views.

The channel splash-screen is dismissed after a mode is activated. When the movie title mode is activated, movie title splash screen 810 may be displayed. According to one embodiment, the device immediately enters the movie view mode. According to another embodiment, after the movie title splash-screen is dismissed, the device enters the movie view mode. Generally, the movie view mode of the channel includes many display views that correspond to different movies playing at a list of theaters (See FIG. 8 and related discussion).

When the theater mode is activated, theater splash screen 910 is displayed. After the theater splash-screen is dismissed, the device enters the theater view mode. Generally, the theater view mode displays a list of theaters, along with the movies playing at the theater, based on a user's preference and/or their geographic location (See FIG. 9 and related discussion).

When the top 10 mode is activated, top 10 splash screen 1010 is displayed. After the top 10 splash screen is dismissed, the device enters the top 10 view mode. Generally, the top 10 view mode displays a list of the top 10 movies currently being shown at theaters (See FIG. 10 and related discussion).

While in one of the movie modes, the user may select the "C" button to bring up the splash screen for the current mode. The user may then use the "A" or "B" buttons to move forward or backward through the available modes. The mode may be either selected actively by pressing the "D" button while the mode splash screen is being displayed or passively by waiting a predetermined period of time while the mode splash screen is being displayed.

Movies Mode

Figure 8:
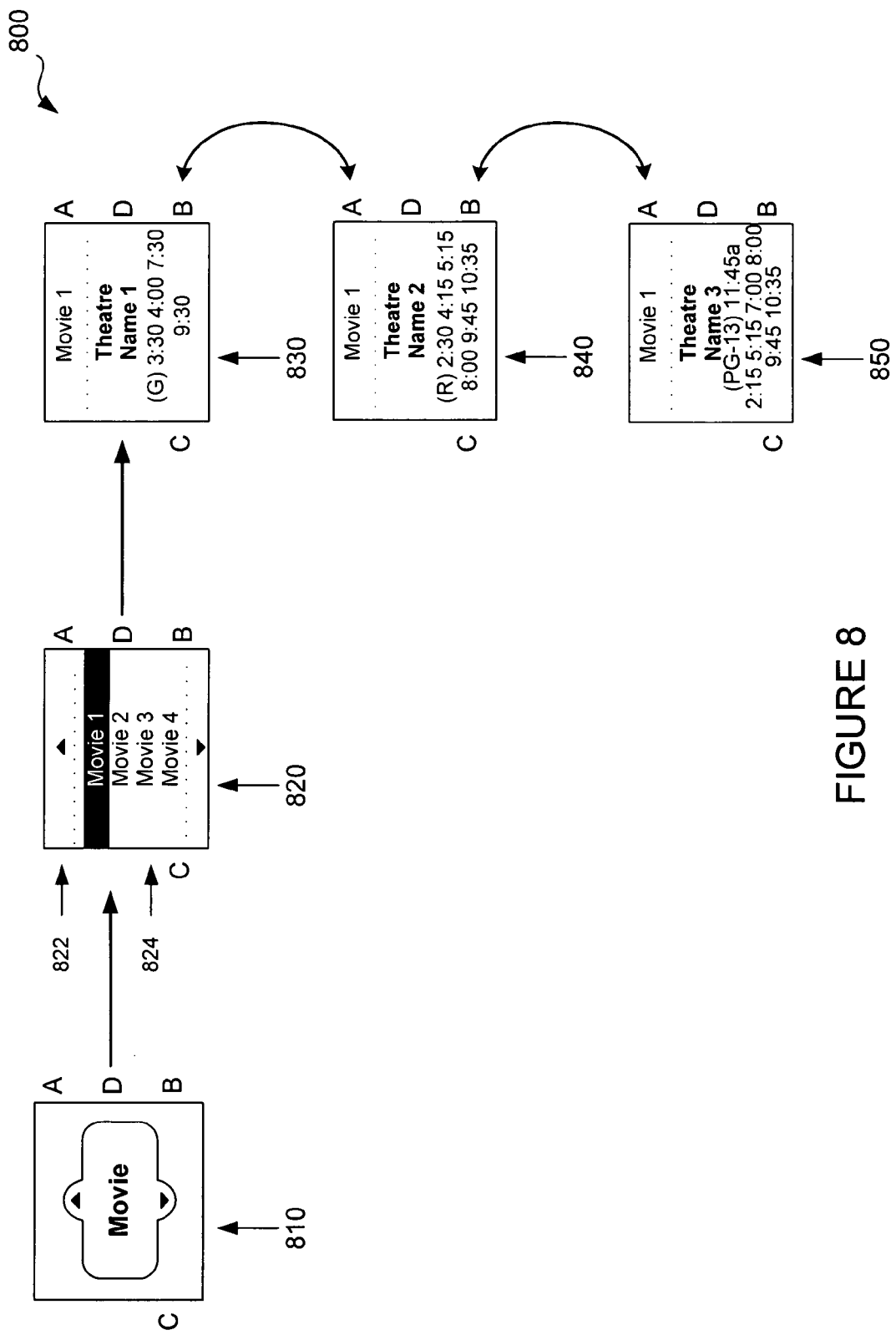
FIG. 8 shows exemplary displays for a movie mode.

FIG. 8 illustrates a movie view mode 800, in accordance with aspects of the invention. Generally, the movies mode is the default mode for the movie channel and lists the movies currently showing in a user's area at the user's selected theaters with their show times and their Motion Picture Association of America (MPAA) rating. In the movies mode, users can locate a movie by name and receive the corresponding show times for the movie at each of their selected theaters which are playing the movie.

Each movie view may be partitioned into a header section (822), and a main body section (824). The header section may display the selected movie, the current time or date, or some other information (See FIG. 6 and related discussion). The header section may also be formatted such that upcoming movie times are indicated by text such as "Next time: [next movie time for currently displayed movie]." As illustrated in the figure, header section 822 displays a graphical arrow indicating to the user that the list may be scrolled.

After a predetermined delay time, the header section of the display screen may change from the one header view to another header view. After another predetermined delay time, the header section of the display screen may change back to the first header view. The toggling of the display section may be referred to as a passive interaction that is activated by "parking" the electronic device in the movie mode of the movie channel. The passive interaction is deactivated by activation of one or more selectors on the electronic device.

The movies mode list view (820) shows a list of movies currently playing at the user's selected theaters. The list is sorted in alphabetical order by title and is arranged in a circular fashion. In other words, selecting the "next" button (button "B") from the last title selects the first title and selecting the "previous" button (button "A") from the first title selects the last title contained within the list. As can be seen by the figure, the list view shows four movie titles per display page and the currently selected item is reverse highlighted. If the movie title does not extend to the opposite side of the screen, the highlighting box continues to the end. According to one embodiment, the title is truncated when it does not fit within a constrained length. The title may also be scrolled.

The user may also perform a speed browse operation that allows the user to quickly go through the list of available movies. Holding down the "A" button or the "B" button for a predetermined time enters the speed browse function. When the user first drops into the list view mode, the first title is automatically selected. The user can select the next selection down in the list by selecting the "B" (next) button. If the user is on the bottom selection of the screen and presses the "B" button, the new selection remains at the bottom while the rest of the list appears to scroll up. The behavior is similar when the user presses "A" (previous) button while the top item on the page is selected.

According to one embodiment, scrolling happens one item at a time unless the user is in speed browse mode. When the channel enters speed browsing, the display is grayed out and a large box appears in the middle of the screen with the first letter of the next item that doesn't start with the same letter as the current item. When the user is holding down the "B" button, the "next" first letter is selected. When the user is holding down the "A" button the "previous" letter is selected. As long as the user is holding down the "A" or "B" button, the letter changes at a predetermined interval (i.e. every 0.25 seconds) to the "next first letter" or "previous letter" in alphabetical order. If there are no movies that begin with that letter, that letter is skipped. When the user releases the button, the first movie (alphabetically) that begins with the letter that was showing when the button was released is selected and displayed at the top of the screen. Since the list is circular, "next" from "Z" goes to "A."

Selecting the "D" button navigates to theater show times for the selected movie.

Displays 830-850 illustrate detailed views for Movie 1 which was selected by activating the "D" button.

The main body section of each movie view indicates the theater name, MPAA rating, and remaining show times that day for the movie at the selected theater The main body section may also include a combination of text and graphic elements that are centered on the display both horizontally and vertically beneath the header section. Similar to the header section, the main body section of the display area may be periodically updated when passive interaction is activated by parking the device on the movie view mode of the movie channel.

According to one embodiment, movie times that are thirty minutes in the past are not displayed on the device since the show has already started or finished. The electronic device may be arranged to apply a logic rule set to dynamically change the content that is associated with the header and main body sections of the display.

Activation of the previous and next selectors (e.g., the "A" and "B" buttons) allows the user to scroll through the theaters currently showing the selected movie. According to one embodiment, one theater is displayed along with the corresponding remaining show times for the day. The show times for the selected movie are listed beginning on the line following the theater name. If there are too many show times to fit on a single screen, then the list auto-flips after a predetermined time (e.g. 3 seconds) to show the next list of times. The list will continually cycle through the times as long as the user has the current view selected.

The view is centered top to bottom and left to right and the movie times are listed in the preferred format of the user's watch (12- or 24-hour mode). If the user is in 12-hour mode, the AM times are suffixed with an "a", as shown in view 850. When there are no show times left for the current day, the display shows "no remaining shows today." According to one embodiment, the movie times are listed in chronological order starting at 4 AM such that a 12:30 AM movie time is listed last in the movie times.

The "A" (previous) button navigates to the previous theater, alphabetically, for that movie. According to one embodiment, if on the first theater for the currently selected movie, selecting the "A" button causes a "beep" which indicates to the user that they are at the beginning of the list. The list may also be arranged as a circular list, in which pressing the A button when at the beginning of the list would navigate the user to the theater at the end of the list.

The "B" (next) button navigates to the next theater showing the movie. If the last theater is being displayed for the currently selected movie then selecting the "B" button causes a "beep" to indicate to the user that they are at the end of the list.

Selecting the "D" button from any screen navigates the user back to the list view of movies with the current movie selected within the list.

Theaters Mode

Figure 9:
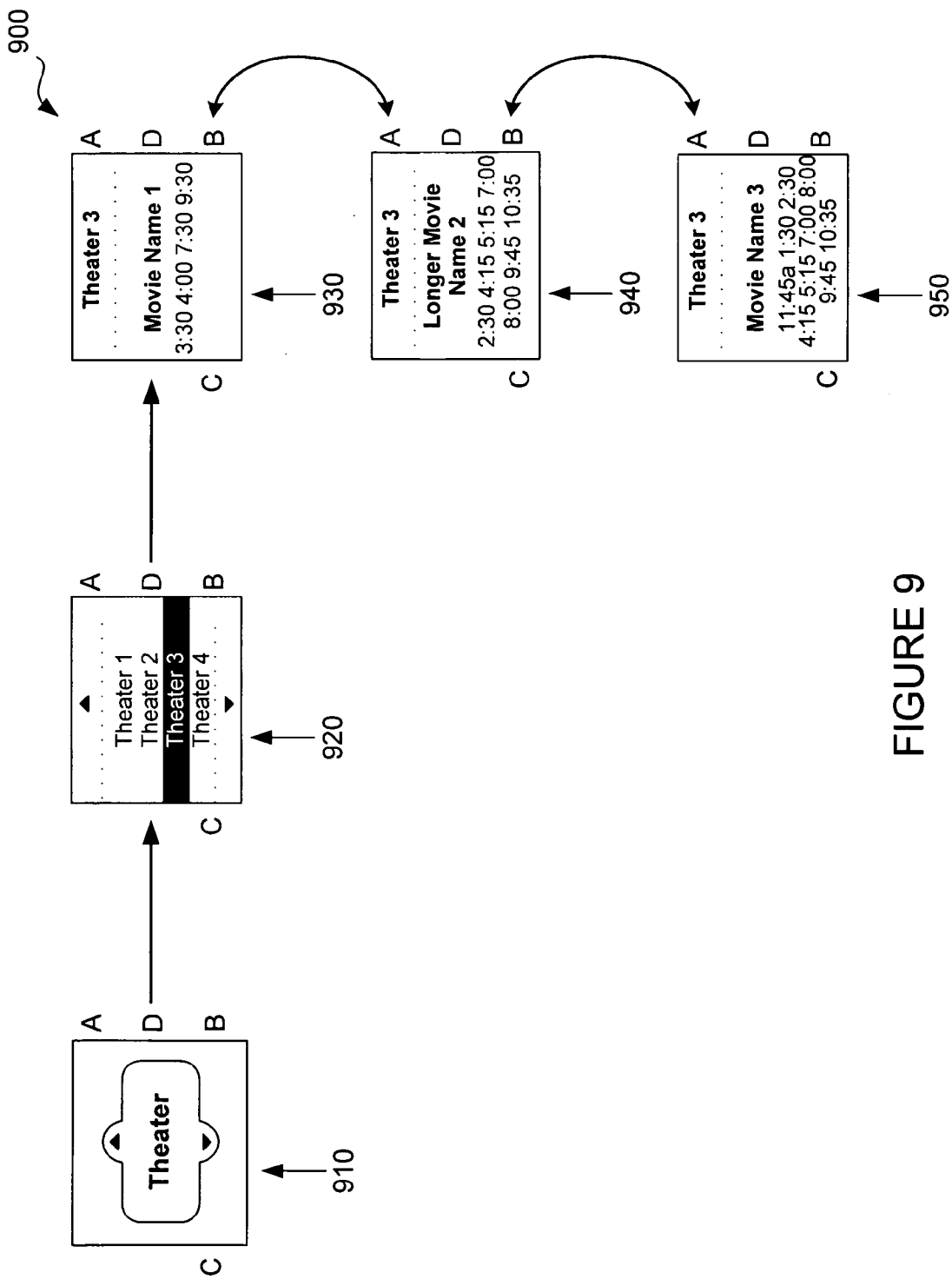
FIG. 9 illustrates exemplary displays for a theater mode.

FIG. 9 illustrates a theater mode 900 for the movies channel, in accordance with aspects of the invention. The theaters mode allows a user to search movies and show times for a specific theater. The theater mode utilizes a list browser function and a speed browse function to navigate through the theaters. When the user is within their home area, the theater mode lists the user's specified theaters. When the user is traveling, the theater mode lists a default set of theaters for the area in which the user is traveling. The list of default theaters may also be customized based on the user's preferences, by their current location, or by selecting the largest theaters in the area.

After selecting the theater mode (910), the theater mode list view (920) is displayed. The theater mode list view shows the user a list of theaters from which to select a theater. The list is sorted in alphabetical order by theater name and is a circular list.

The "A" button selects the previous item on the list. If the currently selected theater is the first item of the list then the last item on the list is selected. Similarly, selecting the "B" button advances the selection to the next theater. When the selected theater is the last theater in the list then the first item on the list is selected. Pressing the "A" button or "B" button for a predetermined time (e.g. two seconds) selects the speed browse function, as described above in conjunction with the movie view mode.

Once the user has selected a theater, the mode enters a details view. The details view (930, 940, and 950) lists the movies at the selected theater in alphabetical order along with show times. According to one embodiment, the show times for the current day are shown. When there are no show times left to display, the movie name is displayed along with a message showing "no remaining shows today."

The header section displays the theater name of the selected theater and the body section includes the movie name plus the show times. If there are too many show times to fit on a single screen, then the show times list auto-flips after a predetermined time (three seconds) to show the next list of times. The list continues to auto-flip until deselected.

While in the theater details mode, selecting the "A" (previous) button navigates to the previous movie for that theater. If on the first movie for that theater, "A" causes a "beep" to indicate "beginning of list."

Selecting the "B" (next) button navigates to the next movie for the selected theater. If the user is currently viewing the last movie for the selected theater pressing the "B" button causes a "beep" which indicates that the user is at the end of the list.

Selecting the "D" button from any screen navigates back to the list view of theaters with the current theater selected.

Top 10 Mode

Figure 10:
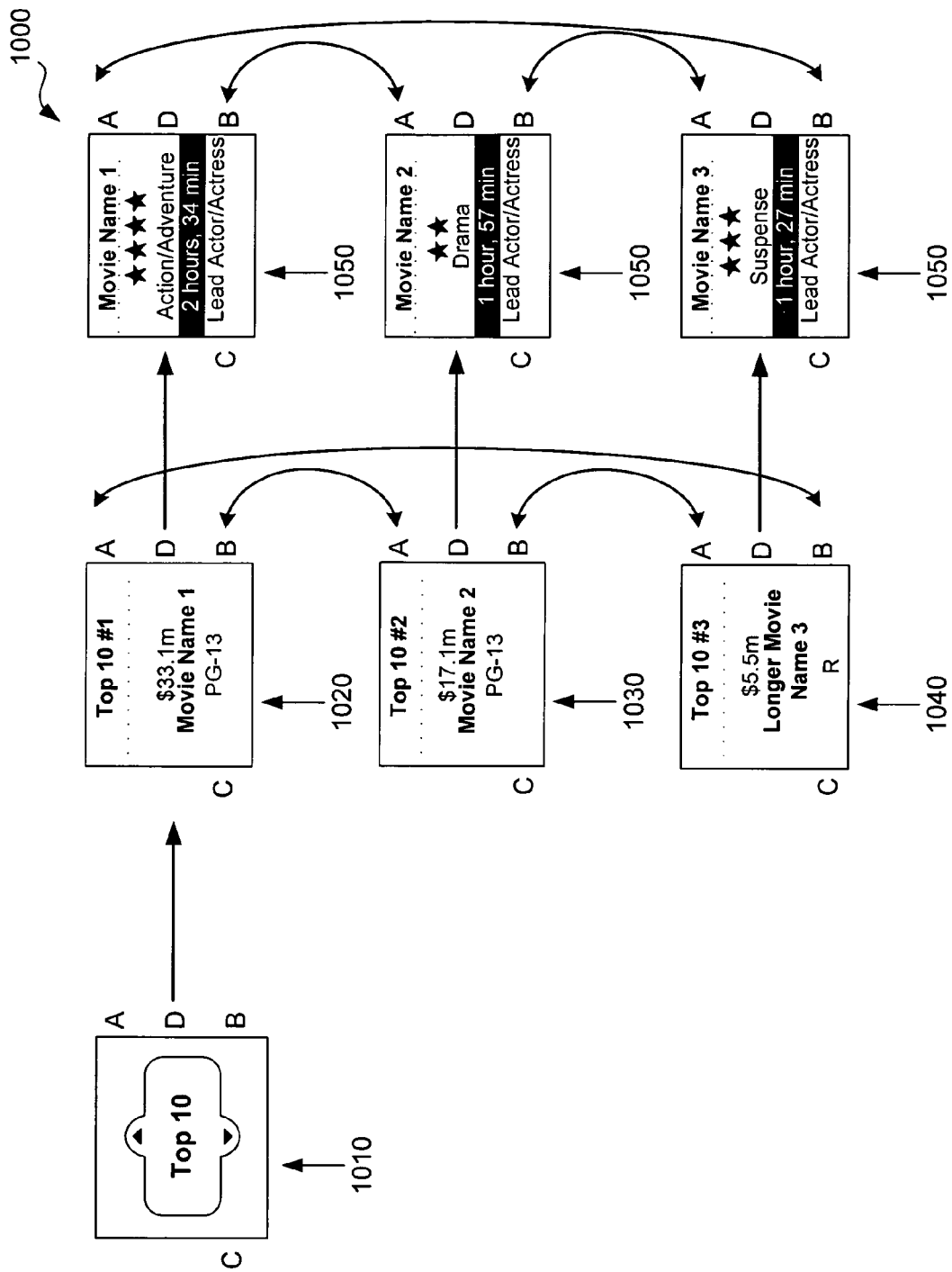
FIG. 10 shows exemplary displays for a top 10 mode.

FIG. 10 shows a top 10 mode 1000 of a movie channel, in accordance with aspects of the invention. The top 10 mode is designed to keep users informed about what movies are currently the "hot" movies.

Selecting the top 10 mode from screen 1010 provides the user with a glance view for the top 10 movies (1020, 1030, and 1040). The glance view shows the top 10 box office revenue earners for the past week. If the user has not pressed any buttons for a predetermined time (e.g. 5 seconds), the watch begins to automatically cycle through the top 10 list. The user may also manually advance through the list by pressing the next or previous buttons.

The top 10 list is sorted in order from most revenue earned to least revenue earned. If a film is tied with another film then the tied films are shown as "T-<ordinal>" and then sorted alphabetically. Each movie still holds a place so the ordinal of the next movie indicates how many movies are in front of it. For example, if there are two movies tied for second, then the movie after the two tied moves is labeled #4.

The header section includes the name of the movie. The main body section includes the review score for the movie, the box office earnings, the movie's MPAA rating, and lead actors/actresses. The main body may also include a director, preview, and the like.

According to one embodiment, the revenues in the body section are displayed in millions of dollars (abbreviated with an "m" to one decimal point. When in the glance view, the top 10 movies are arranged in order of revenue in a circular list.

Selecting the "A" button navigates the user to the previous movie in the top 10 list. If the current movie is movie #1 and the user selects the "A" button, then the last movie in the list is displayed.

Selecting the "B" button navigates the user to the next movie in the top 10 list. If the device is currently displaying the last movie and the user selects the "A" button, then the first movie is displayed.

Selecting the "D" button navigates the user to a detail view for the currently selected movie. For example, selecting the "D" button from display 1020 provides the user with detail view display 1050. The details view attempts to display a reviewer rating, a genre, a running time, and lead actor/actress in the movie.

According to one embodiment, the Top 10 list is refreshed each week after the top grossing films are released. Since the data is not time critical, however, a long latency is acceptable. Top 10 listing information is not automatically expired as it is replaced when new data as it is received. According to one embodiment, the top 10 listing content is broadcast as a single unit, rather than in pieces. This helps, for example, to prevent the watch from accidentally displaying a #1 and #2 top movie from the current week but the #3-#6 top movies from the previous week.

Glance Channel

According to one embodiment, some of the top 10 information appears in another channel on the electronic device besides the movie channel. The glance channel is a channel which may include information from a variety of channels to which the user subscribes. According to one embodiment, the top three grossing movies appear twice as often within the glance channel as the number four and five grossing films appear. Similarly, the number four and five movies appear twice as often as the sixth through tenth grossing films. Other information that may be displayed includes new release information, box office records, movie news, and the like.

Customization

Figure 11:
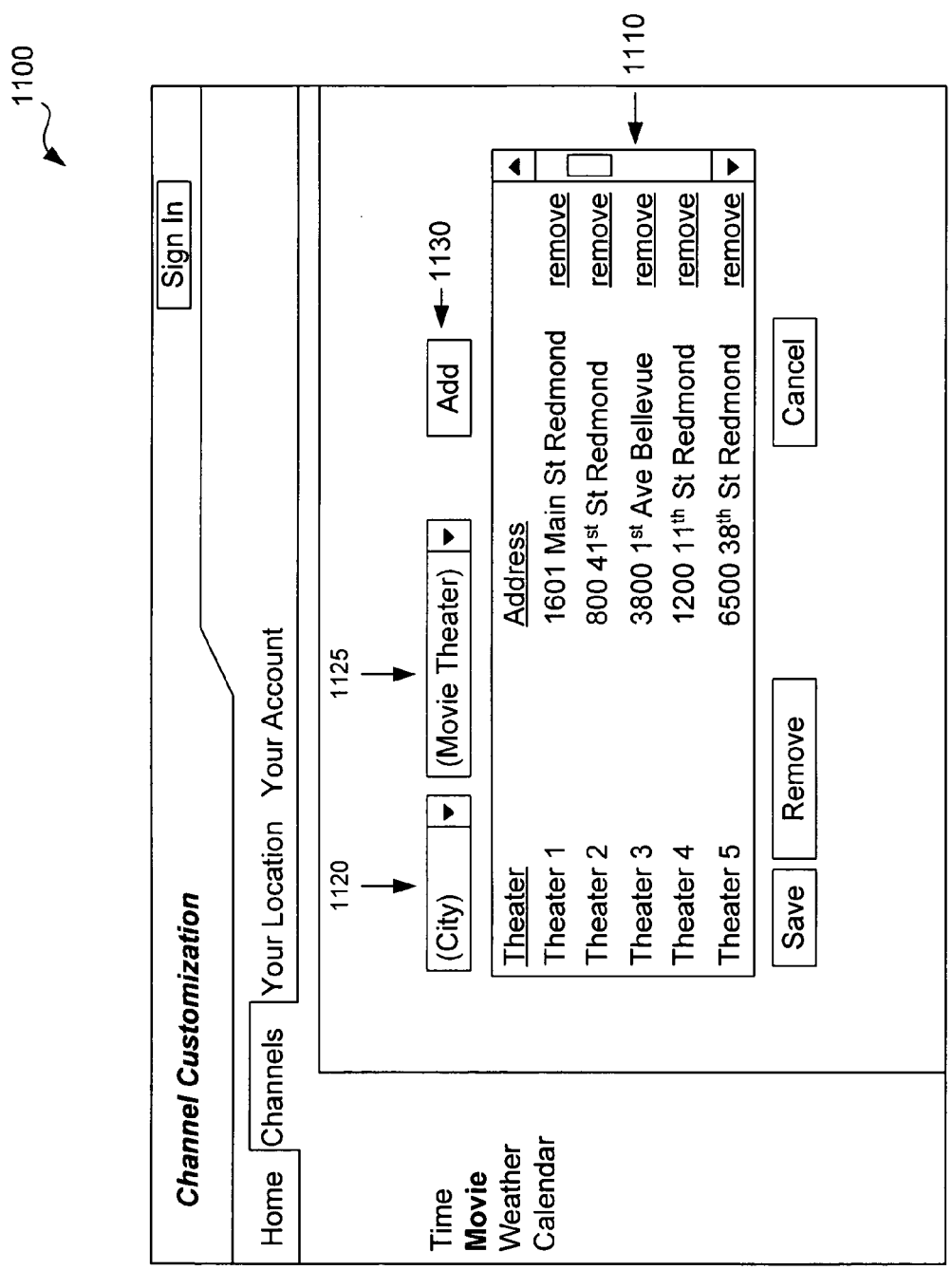
FIG. 11 illustrates a web user interface for inputting user preferences for a movie channel, in accordance with aspects of the present invention.

FIG. 11 illustrates a web user interface for inputting user preferences for a movie channel, in accordance with aspects of the invention.

Theaters can be selected via a computer type interface such as through an internet based application, a computer based application, or any other reasonable method of accessing and altering configuration information. In one embodiment, a subscriber to the movie channel can accesses web page 1100 to select or change various features associated with the movie channel. In another embodiment, movie theaters already selected on a user's Internet home page may be retrieved from the user's home web site and then used to populate the theater list (1110).

In another embodiment, when the user initially subscribes to the movies channel, the list of theaters is populated with five nearby theaters based on the user's ZIP code. If there are more than five theaters in a user's ZIP code, the first five theaters alphabetically are picked. If there are fewer than five theaters, the theaters may be obtained from a neighboring ZIP code.

The user can change the theaters by selecting the "City" dropdown menu (1120) and then choosing theaters within the city. City dropdown 1120 lists all of the cities with movie theaters within broadcast range of the broadcast towers. A typical broadcast range is about thirty miles. The movie theater dropdown (1125) is populated with the theaters in the selected city for which show times are available.

When a city and theater are chosen, the user can select the "Add" button (1130) to add the theater to list 1110. The new item is highlighted in the list; the "City" remains selected, but the "movie theater" dropdown resets to an "unselected theater" position. The "Add" button is grayed out until the user makes a valid entry in both the city drop down and the movie theater drop down menus.

The drop down list is populated from a "live" list of theaters, which is automatically updated regularly from a data feed. Theaters are automatically added or removed from the movie theater list when they are opened or closed.

When a user reaches a predetermined limit of theaters the "Add" button is grayed out and red text appears beneath the button explaining that the number of theaters selected is limited. According to one embodiment, the number of theaters is limited to ten (10) movie theaters.

The theaters list shows the theater names in alphabetical order and the street addresses of the theaters, along with a hyperlink to "remove" the theater from the list. When the user clicks on "Remove" the list refreshes and is displayed without that theater. In the case when the user removes all of the theaters from theater list 1110, the top 10 mode is displayed on the electronic device, but the movies and theaters mode are deactivated and not displayed.

The theaters chosen through the web interface are the theaters, along with the corresponding movies playing at the theaters, delivered to the user's device.

Other features may also be customized through the use of an interface. Some of these features include, but are not limited too: filtering movies by rating, genre, actor/actresses, directors, and the like.

Operating Environment

Figure 1:
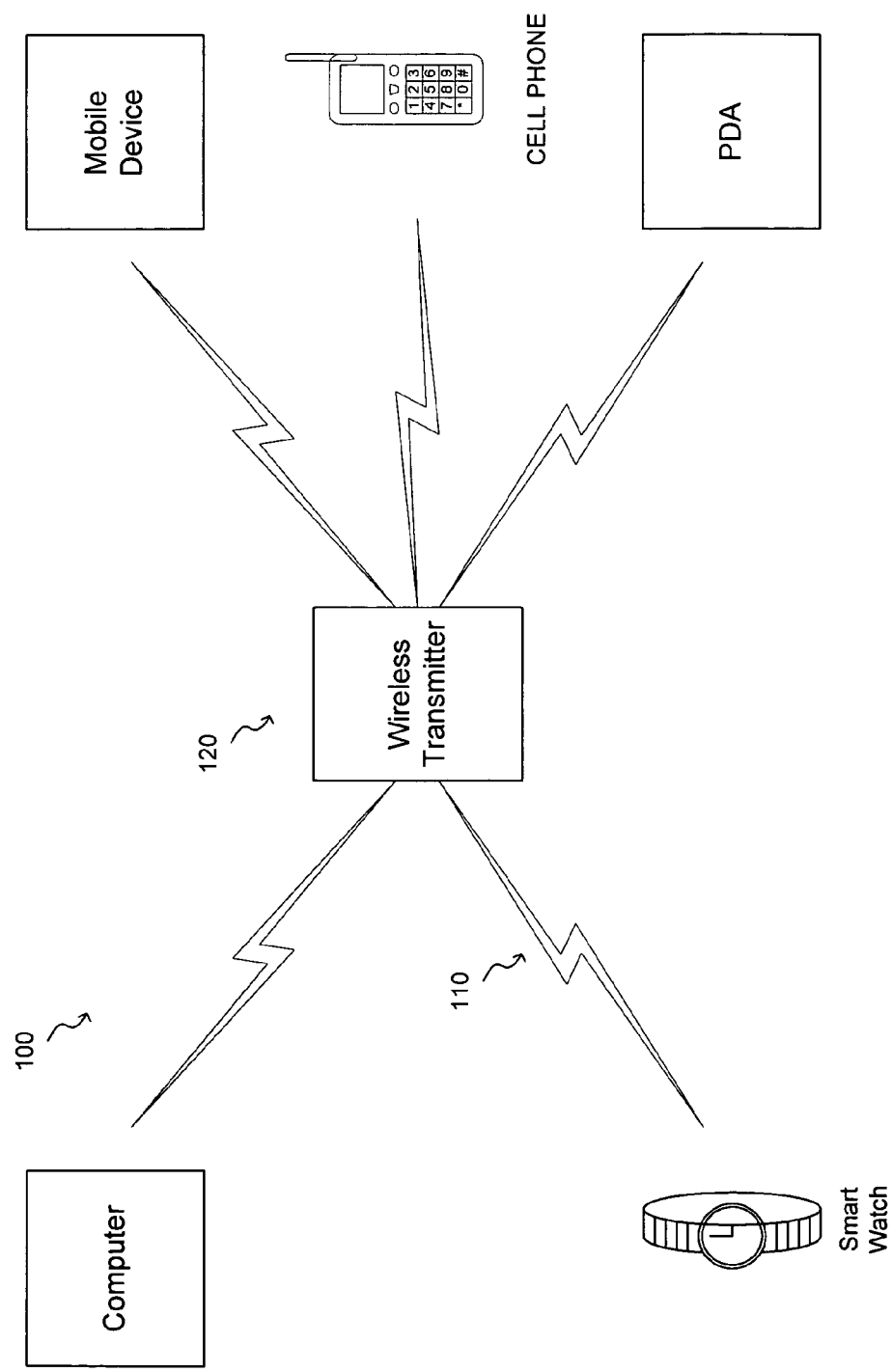
FIG. 1 illustrates an operating environment.

FIG. 1 illustrates an example operating environment for the present invention. As illustrated, operating environment 100 includes wireless transmitter 120 that is responsible for delivering content to wireless devices. According to one embodiment, the wireless transmitter may include a cellular tower that is used to communicate with mobile devices, such as cell phones, notebooks, pocket PCs, long-distance communication links, and the like. According to another embodiment, the wireless transmitter may include an FM transceiver that broadcasts signals over communication channel 110 to the various electronic devices. The FM broadcast may be any number of types including but not limited to: a standard FM transmission, a sub-carrier FM transmission, or any other type of FM transmission as may be desired. Example electronic devices that have an FM receiver or transceiver may include a desktop computer, a watch, a portable computer, a wireless cellular telephone (cell phone), and a personal data assistant (PDA). The electronic devices are arranged to receive information from the wireless broadcast.

Some example electronic devices that may include an electronic system arranged to operate according to the interaction model are illustrated in FIG. 1. Each of the electronic systems receives messages/information over the communication channel.

According to one embodiment, each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., a wireless watch device) receive message packets according to shared and private messages that are directed to the client device. Message packets are organized in groups according to logical slot (or channel) entry numbers. For example, a particular electronic device is configured to receive a selected group of channels from the available channels. The message packets associated with each of those channels is received, processed, and stored in the client device. The stored message packets can be reviewed using a user interface that employs an interaction model, in accordance with the present invention.

Example channels include: a sports channel, a time channel, a messages channel, a calendar channel, a weather channel, a stocks channel, a news channel, and a movies channel. Messages associated with each channel include message content that is based on the particulars of the channel. For example, the sports channel may include results of games played involving teams the user in which the user desires to follow.

FIG. 2 is a schematic diagram illustrating functional components of an illustrative electronic device that may be used to interact with channel content, in accordance with aspects of the invention. Electronic device 200 includes processor 260, memory 262, display 228, and user interface 232. Memory 262 generally includes both volatile memory (e.g., RAM) and non-volatile memory (e.g., ROM, Flash Memory, or the like). Electronic device 200 may include an operating system 264, such as the Windows CE operating system from Microsoft Corporation or another operating system, which is resident in memory 262 and executes on processor 260. User interface 232 may be a series of push buttons, a scroll wheel, a numeric dialing pad (such as on a typical telephone), or another type of user interface means. Display 228 may be a liquid crystal display, or any other type of display commonly used in electronic devices. In one example, display 228 may be touch-sensitive that would act as an input device.

One or more application programs 266 are loaded into memory 262 and run on the device. Examples of application programs include movie programs, time programs, and so forth. Electronic device 200 also includes non-volatile storage 268 that is located within memory 262. Non-volatile storage 268 may be used to store persistent information which should not be lost if electronic device 200 is powered down. Applications 266 may use and store information in storage 268, such as movie content used by a movie application, appointment information used by a calendar program, and the like.

Electronic device 200 includes power supply 270, which may be implemented as one or more batteries. Power supply 270 might further include an external power source, such as an AC adapter or a powered docking cradle that supplements or recharges the batteries.

Electronic device 200 is also shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived content. Electronic device 200 can control each alert mechanism separately (e.g., audio, vibration, as well as visual cues).

Electronic device 200 also includes a communication connection, such as radio interface layer 272, which performs the function of receiving and/or transmitting radio frequency communications. Radio interface layer 272 facilitates wireless connectivity for electronic device 200. Transmissions to and from radio interface layer 272 are conducted under control of the operating system 264. In other words, communications received by radio interface layer 272 may be disseminated to application programs 266.

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

In one example of the present invention, electronic device 200 is a mobile electronic device such as a watch device that includes a wireless interface. An exemplary watch device is shown in FIG. 3.

Broadcast Channels

Figure 4:
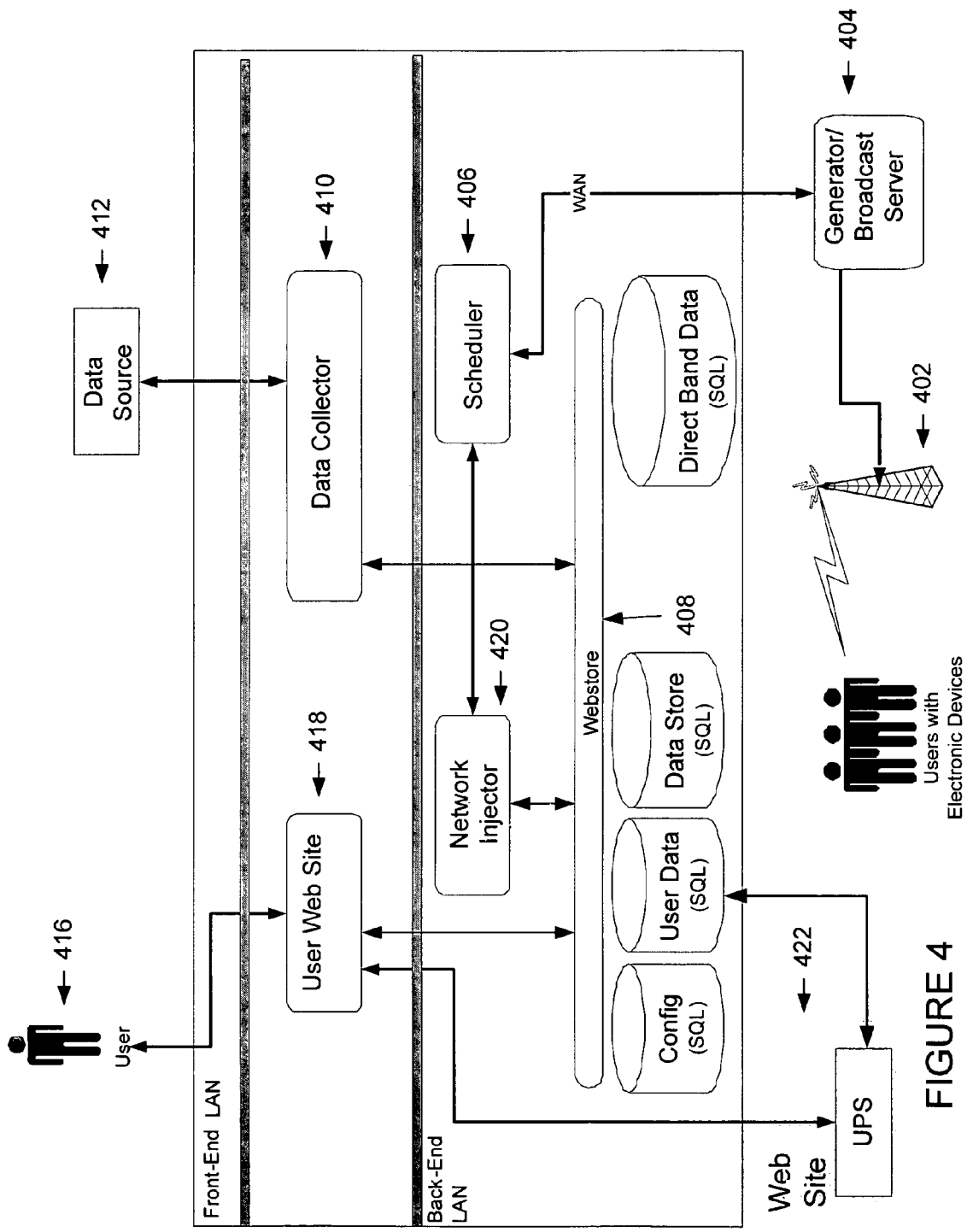
FIG. 4 illustrates a system for delivering and configuring channel information to an electronic device.

FIG. 4 illustrates a system for delivering and configuring channel information to an electronic device, in accordance with aspects of the invention.

A user, such as user 416, may customize their channels through user web site 418. Using website 418 the user may set options and select information associated with channels to which they have subscribed. For example, the user may select the movie theaters which are provided to the electronic device. The selected options are stored in a data store, such as webstore 408. Channel information and various options may also be automatically retrieved from a web site to which the user participates in. For example, web site 422 may be the user's home page in which the user has already selected various options customizing their page. These options may be used to populate the options associated with various channels. For example, a user's selected cities may be used in a weather channel, the user's selected theaters may be used in a movies channel, a user's selected stocks they desire to track may be used in a stock channel, and the like.

Data Collector 410 is configured to collect data from one or more data sources, such as data source 412, relating to a channel. For example data collector 410 may retrieve theater and show time information from one data source, and current "hot" movies from another data source.

According to one embodiment of the movie channel, data source 412 provides a feed of data that includes the following: theater names; locations (ZIP and street address); show times for each movie and each theater; movie names, ratings, genre; the top 10 grossing movies of the last week; how much each movie grossed (in millions of $); reviewer rating (# of stars); genre (e.g. Action, Documentary, Kids, Comedy, etc.); running time; and lead actors and actresses.

Data collector 410 may store the data in a data store, such as webstore 408, for later broadcast. According to one embodiment, data store 410 communicates with network injector 420 which then stores the data in webstore 408.

Broadcast transmitter tower 402 is arranged to provide a communication signal that is configured for reception by users with electronic devices that are located within a service region. Broadcast tower 402 transmits in response to generator/broadcast server 404. Generator 404 may communicate with scheduler 406 via a network communication link. Scheduler 406 is configured to schedule broadcast transmissions relating to channel information. Since movie data does not change very often, the data is scheduled to broadcast at a low priority level. Additionally, since the majority of users view movies on the weekends, the movie data may be broadcast more frequently during the weekend. Movie times may also be loaded early in morning since they do not typically change during the day. The device can also receive data and determine how long the data is valid. For example, the device could receive movie data on a Monday morning and know that the data is valid until the end of Thursday. This information may be included in the application on the device, or encoded in the data sent to the device. This helps the device save resources by not having to repeatedly download the same data.

Selected services are entered in a database, such as webstore 408 for broadcast transmission at a later time. At the designated time (or time interval) scheduler 406 communicates with broadcast server 404 to begin a transmission sequence of data for the selected services. Broadcast server 404 converts the data to the appropriate format for transmission (i.e. an FM signal) and relays it to broadcast tower 402. In an alternative example, scheduler 406 communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region receives the shared and personal messages. Personal messages, however, may only be decoded by a single client.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Client devices can determine the current service region based on information that is included in the broadcast transmissions. The time zone can be determined based on the current service region such that the client device can adjust any time related information. Moreover, the time and date functions of the client device may be synchronized based on information that is included in the broadcast transmissions.

Each service region has a set of default theaters that is used when a user is roaming. The list of default theaters for a region is built dynamically and is occasionally refreshed to help ensure that the theater list is current. According to one embodiment, the list is refreshed every two weeks. The list is created based on the largest theaters in the most densely populated areas. This assumes that a traveler is more likely to be traveling in a densely populated area and maximizes the number of movies provided to the electronic device. To select the set of theaters, data collector 410 joins a density center table for the region with a list of theaters in the area and then sorts the theaters by the number of screens at the theater and selects the five largest in the region. If a density center does not have at least five theaters then the area is expanded until five theaters have been selected for the region.

According to one embodiment, theater names change fairly rarely and therefore are sent by broadcast server 404 as part of the configuration of the movie channel on the electronic device. The electronic device stores the name and corresponding ID of the theater such that when it receives a movie broadcast transmission the device may match the ID with the name of the theater. Whenever a theater name changes a configuration message is prepared and sent to users who have selected that theater. Alternatively, the theater names may be included in a broadcast stream. Since theater names change so rarely, including the names in the broadcast may be a waste of bandwidth.

According to one embodiment, movie titles are broadcast in one stream with IDs and show times are broadcast on a separate stream. This helps to save bandwidth by avoiding broadcasting a movie name (relatively costly) multiple times if it plays in multiple theaters. According to one embodiment, movie information is broadcast twice an hour.

A separate stream is received by roaming users. The electronic device is programmed to listen to the "roaming" stream when the user is not in their home region. The stream is compact: it broadcasts the same data that a user would receive in a configuration message: the theater name and the ID of show times.

Process Flow

Figure 5A:
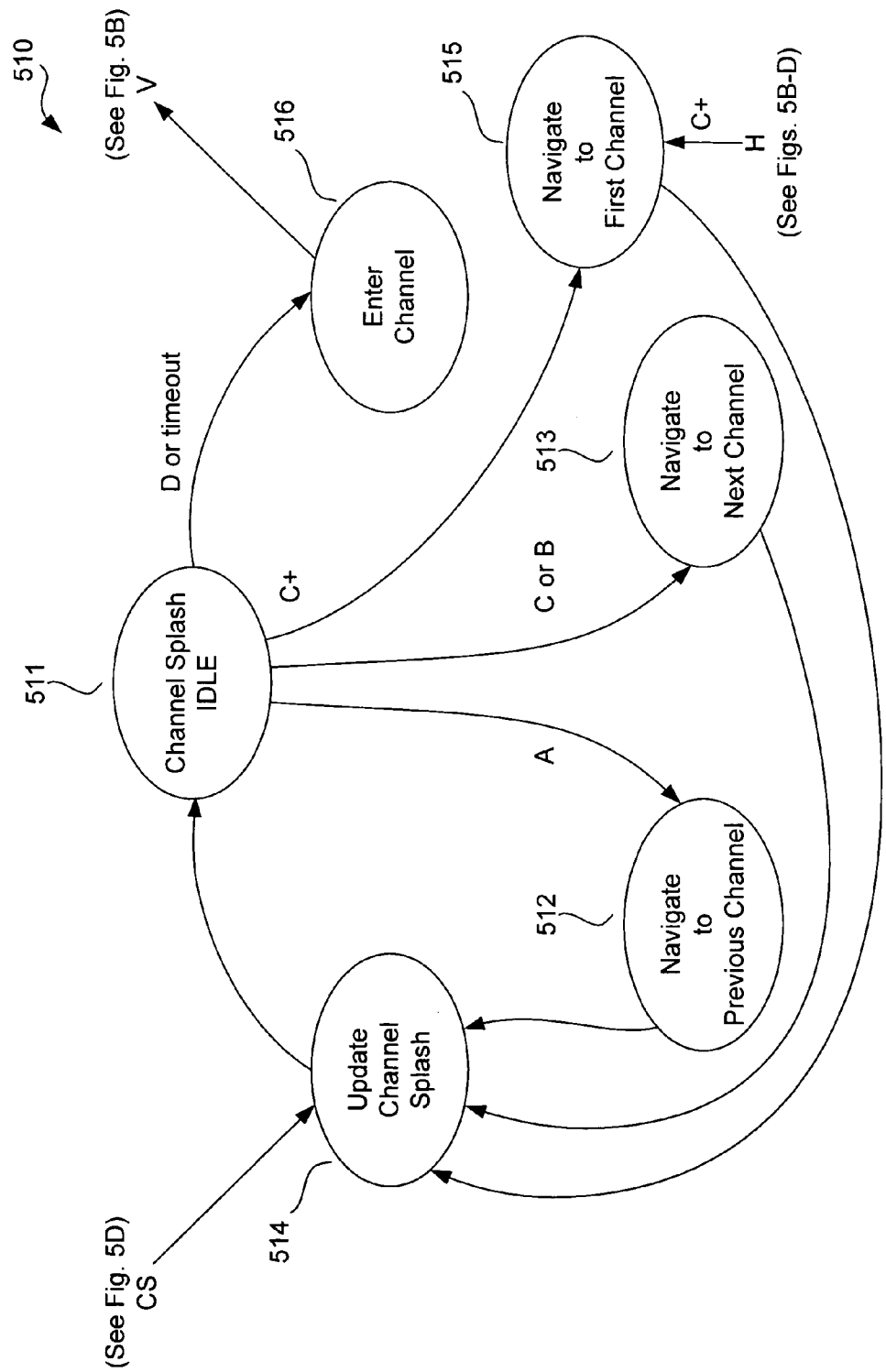
Figure 5B:
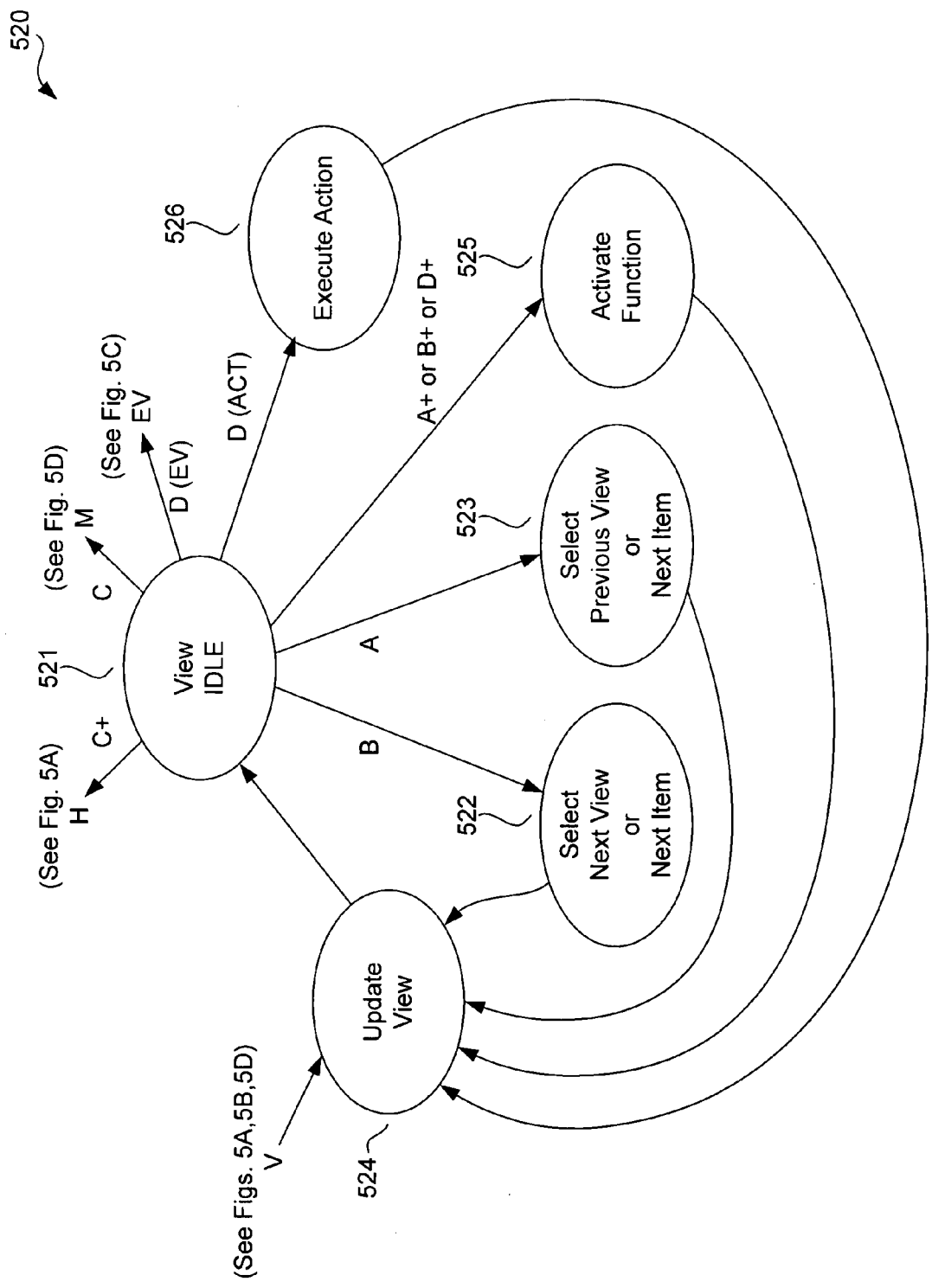
Figure 5D:
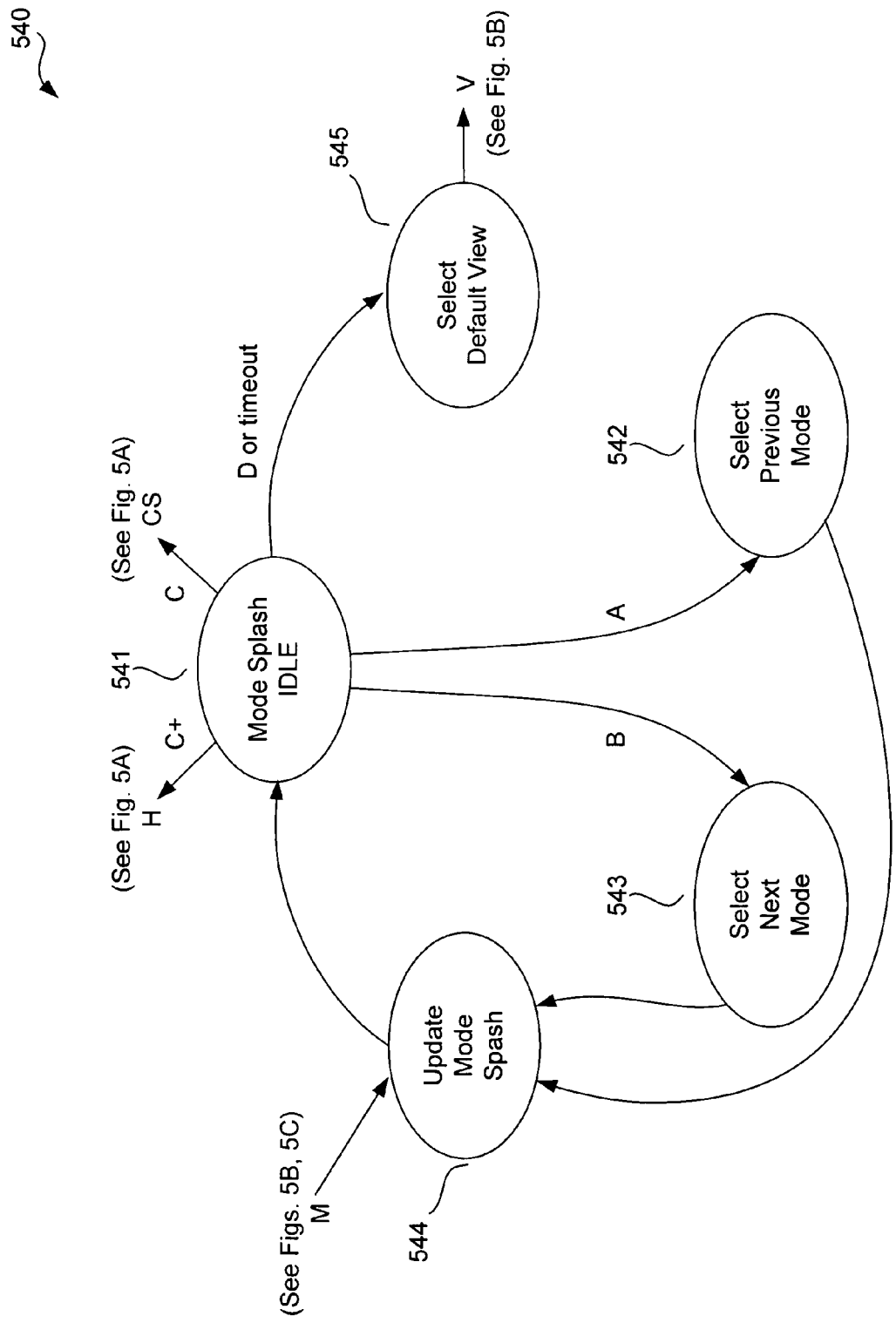

Process flow diagrams for navigation function of an example electronic device are illustrated in FIGS. 5A-5D. The process flow diagram illustrated in FIG. 5A is predominately focused on channel splash activity. The process flow diagram illustrated in FIG. 5B is predominately focused on view activity. The process flow diagram illustrated in FIG. 5C is predominately focused on extended view activity. The process flow diagram illustrated in FIG. 5D is predominately focused on mode splash activity.

Every electronic device has at least one channel that corresponds to the home channel. For a watch type of device, the home channel corresponds to a time channel. However, different home channels can be assigned to every electronic device. Whenever the currently selected channel corresponds to the home channel, the previous channel corresponds to the last channel (if more than one channel exists on the device). Similarly, the next channel corresponds to the home channel when the current channel is the last channel in the channel list for the electronic device.

Every electronic device has a set of selectors (or buttons) that are selectively activated to navigate various functions in the device. Example selectors are illustrated in FIG. 3. For the purposes of the discussion below, each selector is indicated by a letter such as "A", "B", "C", "D", and "E". Some alternate selector functions may be chosen by sustained activation of a selector button for a predetermined time interval (e.g., two seconds). The alternate selector functions are generally indicated in the figures by a "+" symbol that is adjacent to the selector functions' designating letter (e.g., "C+").

The example electronic device described below includes at least four selectors as indicated by letters "A", "B", "C", and "D". The "E" selector may be arranged to provide additional functions such as backlighting, a back channel selector, as well as any other desired function. Additional extended functions may also be programmed and accessible through multiple selector combinations. For example, one function could be selected by holding the "D" and "A" selectors together ("D+" & "A+") for a predetermined time interval. Additional extended functions can also be programmed using other selector combinations such as "D+" & "B+", "A+" & "B+", as well as others.

Movies Channel Wire Protocol

The movie channel wire protocol includes four streams that are broadcast: the stream information (SI) stream; the theater names (TN) stream; the movie names (MN) stream; and the show times (ST) stream.

The SI stream provides location and change tracking information. The location information includes information on the location of data in the three remaining streams. This includes the total number of items in the wire of these streams. The tracking information includes change tracking information which specifies whether the items of a packet have changed from one wire version to the next.

The TN stream provides the names of the theaters in a region. The MN stream provides the names of the movies available in the region. The ST stream provides the show times for all movies in the theaters.

The following are exemplary data structures of configuration data that is sent to each device.

Class CfgWire is the configuration data sent to each client.

```
class ThtrID
{
    ushort m_usID;
}
class CfgWire
{
    // The following array contains the IDs of the theaters.
    The theaters in a region are
assigned IDs from 0 to the total number of theaters in the region – 1.
    ThtrID[ ] m_ThtrIDArr;
    // The movie wire protocol uses four streams.
    The following array contains the
services IDS associated to these streams.
The Theater and Movie name streams may be
merged.
    ushort[ ] m_SrvcIDArr;
    // 11 bits are set for the index in the TOC.
    public const int c_nBitForIndex = 11;
}
```

According to one embodiment, each user can select 10 movie theaters for which the user wants movie show times. This information is described by m_ThtrIDArr. The size of the bit string to support all of the indexes is based on the largest number of theaters that are in a supported region. For example, if the largest supported region has 361 theaters, then 9 bits are enough to specify all theater Ids in all regions.

The service IDS for the 4 streams used for the movie channel are sent in m_SrvcIDArr. According to one embodiment, the Ids are sent in the configuration packet without the names.

SI Wire Class

Class StrmDscrPacket describes the SI wire.

```
public enum STREAM_TYPE: uint
{
    DESCRIPTION,    // For the description stream
    THEATER,        // For the theater name stream
    MOVIE,          // For the movie name stream
    SHOWTIMES       // For the show time stream
}
public class PcktDscrInfo
{
    // The version for this packet.
    uint m_uiVrsn;
    //
    // The index of the first item in this packet.
    //
    uint m_uiStrtIdx;
    // The number of items in the packet.
    According to one embodiment, up to 256
items can be taken.
    uint m_uiItems;
    // The index of this packet in its stream;
    uint m_uiID;
}
public class StrmDscrPacket
{
```

-continued

```
    // The stream type described by this packet.
    STREAM_TYPE m_strmType;
    // The total number of items in this stream.
    uint m_nItems;
    // The description of the data in the packets of this stream.
    PcktDscrInfo[ ] m_PcktDscrInfArr;
}
```

For this stream, packets dedicated to each one of the other streams are sent. The stream a packet is dedicated to is specified by m_strmType. Field m_nItems specifies the total number of elements in the stream described by the packet. Class PcktDscrInfo specifies information about each packet of the stream described. These are described in more detail below.

In PcktDscrInfo, m_uiVrsn is the version of TOC when at least one object in the packet described was last modified. Field m_uiStrtIdx the starting index of the objects in the packet described. Field m_uiItems specifies the number of items in the data packet described. Field m_uiID specifies the index of the packet described in that packet's stream.

For example, consider a PcktDscrInfo object with the following values, sent in an SI packet, with m_strmType=MOVIE.

```
PcktDscrInfo
{
    m_uiVrsn = 3;
    m_uiStrtIdx = 55;
    m_uiItems = 23;
    m_uiID = 5;
}
```

Referring to the values in the PcktDscrInfo structure, this means that in the MN stream with TOC version 3, the 5th packet starts with the 55$^{th}$ movie name and contains 23 movie names.

TN and MN Wire Classes

The wire classes for the TN and MN streams are described below. Each packet contains an array of names and ratings. For simplicity, the same class is used for Theaters. Since theaters do not have ratings, they are assigned dummy ratings.

```
enum RATING
{
    NR,
    G,
    PG,
    PG13,
    R,
    NC17,
}
class NameStr
{
    string m_strName;
    RATING m_Rating;
}
// The packet class.
public class NamePckt
{
    NameStr[ ] m_NameStrArr;
}
```

ST Wire Classes

The ST wire is described by class MvThtrPacket. The ST wire class represents all the show times for a given movie in a theater. According to one embodiment, the first show time is specified, and the other show times are deltas from the specified show time.

```
class MvShwTimes
{
    DateTime m_First;
    TimeSpan [ ] m_ShwTimeArr;
}
```

If there are M theaters and N movies showing on a day in a region, then there are M*N bits in m_NullShwsArr specifying whether a movie is shown in a theater.

```
class MvThtrPacket
{
    // If m_NullShwsArr[i] is FALSE,
    then the MvShwTimes would have been null for
the Theater-Movie combination and the
null MvShwTime objects are not added to
m_MvshwtmArray.
    bool[ ] m_NullShwsArr;
    MvShwTimes[ ] m_MvshwtmArray;
}
```

If there are M theaters and N movies in a region, then there are M×N MvShwTimes objects sent in all the MvThtrPacket objects sent in the ST stream. The elements are in the following order. First, the N MvShwTimes objects for theater ID=1, then the N objects for theater ID=2, up to the N objects of theater ID=M−1, where the kth MvShwTimes object, in the N allocated to a theater, is null, if this theater does not show the movie ID=k. Otherwise, the kth MvShwTimes object represents the first show times for movie k in this theater.

Data Syncing and Synchronization

The server constructs the SI packets for the data in a TOC version of streams MN, TN, and ST. These streams have the same TOC version. The TOC version of stream SI changes when there is a change in a theater or a change in a name of a movie.

Initially the client reads the packets of SI stream and stores information about the other streams. This information consists mainly of the packets the client is interested in for each stream. Once this information is gathered, the client requests packets in the other streams with index in the range of interest.

When there is a change in stream SI then the client updates the data from the packets of interest for which the m_uiVrsn value in stream SI has changed. These packets are specified by their index in the TOC, or the client requests packets of interest with indexes larger than what the client has seen to this point.

When the client is outside of his region (roaming) then the client uses theaters IDs 1 to 5, as substitutes for their configuration IDs. The data processing is similar to the configured case, with these new IDs.

Channel Splash Operating State

The channel splash operating state is described as follows below with reference to FIG. 5A.

The electronic device has a default initial channel that is referred to as a home channel. The display is updated to indicate the currently selected channel at block 514. Processing continues to block 511 where the channel splash operating state is maintained in an idle state. The electronic system in the electronic device monitors the user interface (e.g., the four selectors) while in the channel splash IDLE state. Processing leaves the channel splash IDLE state when the user activates one or more of the selectors or a timeout has occurred. The display actively maintains the splash screen to indicate the current channel selection while the channel splash IDLE state is active at block 511. Splash screens may include one or more graphic elements and/or text elements. An example channel splash screen for a movie channel is illustrated in FIG. 7. Splash screens may be accompanied by the activation of sound that provides an audible indicator that the channel has changed. The sound associated with the audible indicators may be the same for each channel splash screen, or unique based on either the particular channel or the particular channel type (e.g., news channels are one type, while messages are another type).

Processing flows from channel splash IDLE state 511 to the "navigate up" or "navigate to previous channel" function 512 when the "A" selector is activated. Processing continues from block 512 to block 514, where the display is updated based on the newly selected channel. After the display is updated, processing returns to channel splash IDLE state 511.

Processing flows from channel splash IDLE state 511 to the "navigate down" or "navigate to next channel" function 513 when either the "B" selector or the "C" selector is activated. Processing continues from block 513 to block 514, where the display is updated based on the newly selected channel. After the display is updated, processing again returns to channel splash IDLE state 511.

Processing flows from channel splash IDLE state 511 to the "navigate to first channel" or "navigate to home channel" function 515 when the "C+" selector is activated. The home channel navigation function can be accessed from any channel of the electronic device. The electronic device navigates to the home channel (e.g., the time channel on a watch device) when the "navigate to home channel" function is activated. Processing continues from block 513 to block 514, where the display is updated based on the newly selected channel (i.e., the home channel). After the display is updated, processing again returns to channel splash IDLE state 511.

Processing flows from the channel splash IDLE state 511 to the "enter channel" function 516 when the "D" selector is activated. Alternatively, the "enter channel" function is activated when the electronic system is maintained in the channel splash IDLE state for a predetermined time interval (e.g., a 2 second timeout) without activation of a selector. Processing flows from block 516 to block 524 (see FIG. 5B) when the "enter channel" function is activated as indicated by "V".

The enter channel function performs a series of initializations in the electronic device prior to leaving the channel splash operating state and entering the channel view operating state. Every channel in the electronic device has at least one operating mode. The electronic device selects the current operating mode as a default mode, and a current view as a default view in the currently selected channel when the "enter channel" function is activated.

In one example, a movie channel has a movies mode, a theaters mode, and a Top 10 mode. Multiple views may be associated with each operating mode. In one example, a movie channel may have views for each movie in the Top 10 mode or the movies mode.

Channel View Operating State

The channel view operating state is described as follows below with reference to FIG. 5B.

The electronic device enters the channel view operating state at entry point V, where the selector functions associated with the currently selected channel and operating mode are mapped to the selectors. The display is updated to indicate the currently selected view at block 524. Processing continues to block 521 where the channel view operating state is maintained in an IDLE state. The electronic system in the electronic device monitors the user interface (e.g., the four selectors) while in the view IDLE state. When the user activates one or more of the four selectors, processing leaves the view IDLE state.

The display actively maintains the current view while the view IDLE state is active at block 521. List type views include lists of items that can be selected. Other types of views are simply graphical and/or textual elements that are arranged in a display view. Views may be accompanied by the activation of sound that provides an audible indicator that the view has changed. The sound associated with the audible indicators may be the same for each view (e.g., a beep type of indicator or sound clip), or unique based on the particular view. In one example, an audible indicator is activated when a particular alert notification function is activated.

Processing flows from the view IDLE state 521 to the "previous view" or "previous item" function 522 when the "A" button selector is activated. Processing continues from block 522 to block 524, where the display is updated based on the newly selected view. After the display is updated, processing returns to view IDLE state 521. In one example, the previous view corresponds to the last view when the currently selected view is the first available view in the current mode for the current channel. In another example, the previous view corresponds to an empty view (e.g., "no movies", "no data", etc.) when the currently selected view is the first available view in the current mode for the current channel. In still another example, the previous item in a list is highlighted when the "A" selector is activated.

Processing flows from view IDLE state 521 to the "next view" or "next item" function 513 when the "B" selector is activated. Processing continues from block 523 to block 524, where the display is updated based on the newly selected view. After the display is updated, processing again returns to view IDLE state 521. In one example, the next view corresponds to the first view when the currently selected view is the last available view in the current mode for the current channel. In another example, the next view corresponds to an empty view when the currently selected view is the last available view in the current mode for the current channel. In still another example, the next item in a list is highlighted when the "B" selector is activated.

Processing flows from view IDLE state 521 to the "mode splash" function when the "C" selector (e.g., "mode select") is activated as indicated by "M". Refer to FIG. 5D and related discussion for details. Processing flows from view IDLE state 521 to the select home channel splash function when the "C+" selector is activated as indicated by "H". Refer to FIG. 5A and related discussion for details.

The "D" selector is defined within the context of the current channel, mode, and view. The "D" selector may be defined as a "delete" function, and "enter extended view" function, a "select" function, or an "execute action" function. Not every view in a given channel/mode has an extended view as may be indicated by a null value. Some views may have an action function that is defined within the context of the view in the currently selected mode/channel. The context for each view is assigned to the mode upon entry into the mode for the current channel.

Processing flows from the view IDLE state 521 to the "enter extended view" function when the "D" selector is activated and the extended view is available as indicated by "D(EV)". The extended view is available when defined within the context of the currently selected view. For example, the extended view may be available for a list type view such that the highlighted list item is selected when the "D" selector is activated, and a detailed view associated with the highlighted item is displayed as an extended view. Refer to FIG. 5C and related discussion for details on the extended view processing.

Processing flows from view IDLE state 521 to the "execute action" function at block 526 when the "D" selector is activated and the action function is available as indicated by "D(ACT)". The action function is defined within the context of the currently selected view. For example, a fortune cookie mode may be available in an entertainment channel. Although the fortune cookie mode may only have a single view, the "D" selector may be mapped to an action function that randomly selects fortunes from a list when the "D" selector is activated. After the action is performed (e.g., retrieve random fortune from list, execute an animation sequence), processing continues to block 524 where the display is updated as previously described.

Other special functions may be mapped to the "A+", "B+", and "D+" selectors within the context of the current view. By activating the corresponding selector for a predetermined time interval (e.g., 2 seconds) the corresponding special function is activated as indicated by block 525. Processing continues from block 525 to block 524 where the display is updated as previously described.

In one example, a list browser function is available in a mode that corresponds to movies playing at selected theaters. For this example, activation of the "A" and "B" selectors result in manual navigation through views that correspond to previous or subsequent movies. Activation of the "A+" or "B+" selector may activate a speed browse function.

In another example, a delete function is available in a view that corresponds to a specific movie associated with the movie channel. Activation of the "D+" selector may activate a delete function that removes the currently selected movie from the electronic device.

In still another example, processing may flow from view IDLE state 521 to an "alternate view" function when the electronic system is maintained in the channel splash IDLE state for a predetermined time interval (e.g., a 2 second timeout) without activation of a selector. For example, no action for a predetermined amount of time may result in views associated with the channel automatically rotating to other views associated with the channel.

Extended View Operating State

The extended view operating state is described as follows below with reference to FIG. 5C.

The electronic device enters the extended view operating state at entry point EV, where the selector functions associated with the currently selected extended view are mapped to the selectors. The display is updated to indicate the currently selected extended view at block 534. Processing continues to block 531 where the extended view operating state is maintained in an IDLE state. The electronic system in the electronic device monitors the user interface (e.g., the four selectors) while in the extended view IDLE state. When the user activates one or more of the four selectors, processing leaves the extended view IDLE state.

The display actively maintains the current extended view while the extended view IDLE state is active at block 531. Extended views include graphical and/or textual elements that are arranged in a display view. Extended views may be accompanied by the activation of sound that provides an audible indicator that the extended view has changed. The sound associated with the audible indicators may be the same for each extended view (e.g., a beep type of indicator or sound clip), or unique based on the particular extended view.

Processing flows from extended view IDLE state 531 to the "previous view" or "previous item" function 532 when the "A" selector is activated. Processing continues from block 532 to block 534, where the display is updated based on the newly selected extended view. After the display is updated, processing returns to extended view IDLE state 531. In one example, the previous view corresponds to the last extended view when the currently selected extended view is the first available extended view for the current channel/mode. In another example, the previous extended view corresponds to an empty view (e.g., "no appointments", "no events", "no data", etc.) when the currently selected extended view is the first available extended view in the current channel/mode.

Processing flows from extended view IDLE state 531 to the "next view" or "next item" function 533 when the "B" selector is activated. Processing continues from block 533 to block 534, where the display is updated based on the newly selected extended view. After the display is updated, processing returns to the extended view IDLE state 531. In one example, the next view corresponds to the first extended view when the currently selected extended view is the last available extended view for the current channel/mode. In another example, the next extended view corresponds to an empty view (e.g., "no events", "no data", etc.) when the currently selected extended view is the last available extended view in the current channel/mode.

Processing flows from extended view IDLE state 531 to the "mode splash" function when the "C" selector (e.g., "mode select") is activated as indicated by "M". Refer to FIG. 5D and related discussion for details.

Processing flows from extended view IDLE state 531 to the view function when the "D" selector is activated as indicated by "V". In another example, processing flows from extended view IDLE state 531 to the view function when a timeout interval expires (e.g., 5 seconds). Refer to FIG. 5B and related discussion for details concerning the view functions.

Processing flows from extended view IDLE state 531 to the select home channel splash function when the "C+" selector is activated as indicated by "H". Refer to FIG. 5A and related discussion for details.

Special functions may be mapped to the "A"", "B", "A+", and "B+" selectors within the context of the current view. By activating the corresponding selector for a predetermined time interval (e.g., a 2 second timeout interval) the corresponding special function is activated as indicated by block 535. Processing continues from block 535 to block 534 where the display is updated as previously described.

Mode Splash Operating State

The model splash operating state is described as follows below with reference to FIG. 5D.

The electronic device enters the mode splash operating state at entry point M. The display is updated to indicate the currently selected mode at block 545. Processing continues to block 541 where the mode splash operating state is maintained in an IDLE state. The electronic system in the electronic device monitors the user interface (e.g., the four selectors) while in the mode splash IDLE state. When the user activates one or more of the four selectors, processing leaves the mode splash IDLE state.

The display actively maintains the current mode splash display while the mode splash view IDLE state is active at block 541. Mode splash views include graphical and/or textual elements that are arranged in a display view.

Example mode splash displays for a movie channel are illustrated in FIG. 7. Mode splash displays may be accompanied by the activation of sound that provides an audible indicator that the selected mode has changed. The sound associated with the audible indicators may be the same for each mode splash (e.g., a beep type of indicator or sound clip), or unique based on the particular mode selected.

Processing flows from mode splash IDLE state 541 to the "previous mode" function 542 when the "A" selector is activated. Processing continues from block 542 to block 544, where the display is updated based on the newly selected mode. After the display is updated, processing returns to mode splash IDLE state 541. In one example, the previous mode corresponds to the last mode when the currently selected mode is the first available mode for the current channel.

Processing flows from mode splash IDLE state 541 to the "next mode" function 543 when the "B" selector is activated. Processing continues from block 543 to block 544, where the display is updated based on the newly selected mode. After the display is updated, processing returns to mode splash IDLE state 541. In one example, the next mode corresponds to the first mode when the currently selected mode is the last available mode for the current channel.

Processing flows from mode splash IDLE state 541 to the "channel splash" function when the "C" selector (e.g., "channel select") is activated as indicated by "CS." Refer to FIG. 5A and related discussion for details.

Processing flows from mode splash IDLE state 541 to the "select default view" function 545 when the "D" selector is activated. Alternatively, processing may flow from mode splash IDLE state 541 to the "select default view" function 545 when a timeout interval (e.g., a 2 second interval) has expired. Processing continues from block 545 to the channel view operating state as indicated by "V". Refer to FIG. 5B and related discussion for details.

Processing flows from mode splash IDLE state 541 to the select home channel splash function when the "C+" selector is activated as indicated by "H". Refer to FIG. 5A and related discussion for details.

Example Display Screen Partitions

Figure 6:
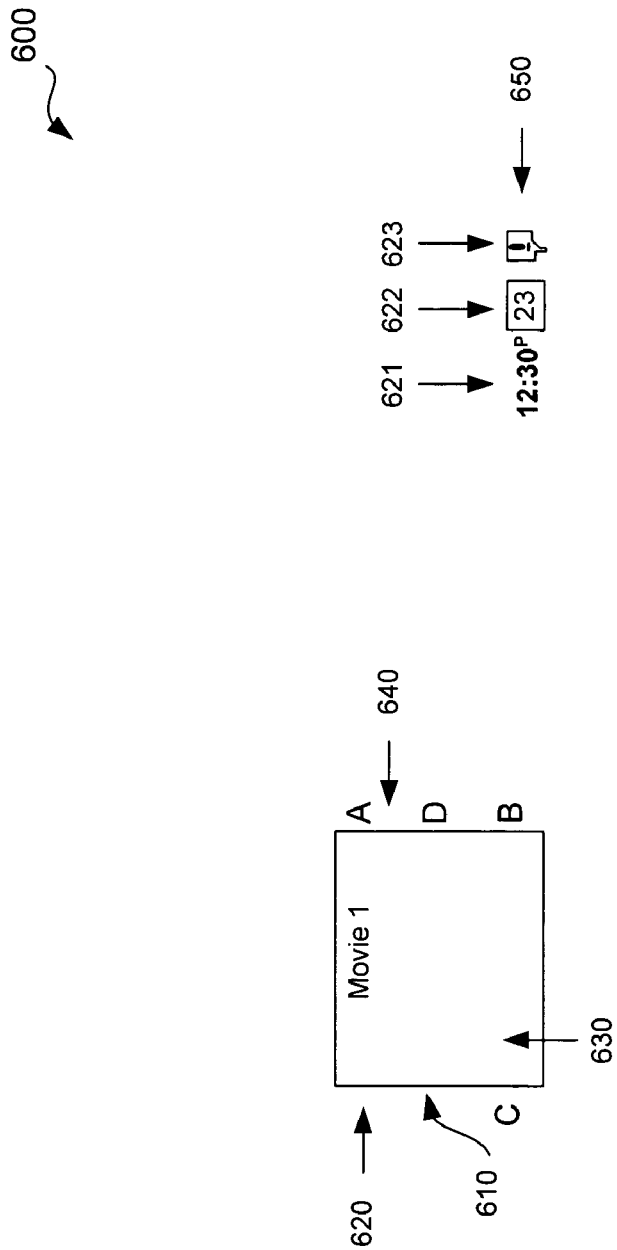
FIG. 6 shows exemplary status indicator headers.

FIG. 6 shows exemplary status indicator headers, in accordance with aspects of the present invention. Example display screen 610 is partitioned into two regions: header region 620 and main body region 630.

Main body region 630 of display screen 610 may include one or more graphical and/or textual information fields that change based on the current context in the current channel, mode, and operating state. In one example context, main body region 630 is a single region for displaying textual information, such as textual information relating to the movie channel. In another example context, main body section 610 may include a graphical representation.

Header region 620 of display screen 610 may include one or more graphical and/or textual information fields. The fields may change based on the current context in the current channel, mode, and operating state. In one example context, header region 620 may include three regions: current time field 621 and current date field 622. In another example context, header region 620 may include three regions (650): current time field 621, current date field 622, and status indicator field 623. In still another example context, header region 620 may include information relating to the channel. For example, the title of a movie may be displayed in header region 620.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for receiving, displaying and interacting with movie channel content associated with a movie channel on a mobile electronic device, comprising:
 automatically and repeatedly receiving a broadcast transmission including the movie channel content encoded on a communication signal that is automatically broadcast to many electronic devices at the same time such that each of the electronic devices receives the same movie channel content; wherein the movie channel content is not personalized when it is broadcast; wherein the movie channel content is received as records; wherein the broadcast transmission includes public messages and private messages; wherein the public messages are decodable by each of the many electronic devices receiving the broadcast and where in the private messages within the broadcast are decodable only by a single electronic device receiving the broadcast; wherein the broadcast movie channel content comprises: a top 10 list of current movies having the ten highest revenues for a week; movie names, movie theatre names, ratings and genres; and wherein the movie channel content is broadcast more frequently during a weekend as compared to weekdays;
 storing at least a portion of the movie channel content on the electronic device;
 associating the movie channel content with a movie channel application on the electronic device;
 filtering the movie channel content based on pre-defined preferences; wherein the pre-defined preferences include determining when there is a designation of: a selection of movie theatres; a selection of movie genre preferences; a selection of ratings; a selection of movie theatres within a designated area; a selection of actors; and a selection of directors; wherein the filtering is based on the pre-defined preferences and is automatically performed on the electronic device after the movie channel content has been received on the electronic device and wherein the filtering creates personalized content on the electronic device; wherein the pre-defined preferences are received on the mobile electronic device through one or more private messages received through the broadcast and wherein the received pre-defined preferences are stored on the mobile electronic device after being received through the one more private messages;
 decoding the received records using the movie channel application; wherein decoding the received records includes associating an index value with an expanded name when one of the records is encoded as an index; wherein theatre names are encoded as an index;
 setting a current view associated with the movie channel; and
 displaying the current view on a display of the electronic device.

2. The method of claim 1, wherein setting the current view further comprises setting the current view to one of: a list of movies; a list of theaters; and a list of top 10 movies on the device.

3. The method of claim 1, wherein setting the current view associated with the movie channel, further comprises selecting a mode associated with the movie channel, wherein the mode is selected from at least one of: a movies mode; a theaters mode; and a top 10 mode.

4. The method of claim 3, further comprising setting the current view to: a list of movies currently playing when the movies mode is selected; a list of theaters when the theaters mode is selected; and a list of top movies currently playing when the top 10 mode is selected.

5. The method of claim 3, further comprising receiving an input indicating a selection associated with one of the modes; and in response to the selection setting the current view.

6. The method of claim 5, further comprising determining when a movie is selected; and in response to the movie being selected showing details associated with the movie.

7. The method of claim 6, wherein showing details associated with the movie further comprises showing at least one of: a list of theaters playing the movie; the movie times; and movie ratings.

8. The method of claim 5, further comprising determining when a theater is selected; and in response to the theater being selected showing movies playing at the theater.

9. The method of claim 1, further adjusting the current view based on user preferences.

10. An apparatus for receiving, navigating, and displaying movie content that is associated with a movie channel, comprising:
 a data store;
 a communication connection configured to receive a communication signal including the movie content that is automatically broadcast to a plurality of mobile electronic devices at the same time and store the movie content in the data store; wherein the movie content is not personalized when it is broadcast; wherein the movie content is received as records; wherein the broadcast transmission includes public messages and private messages; wherein the public messages are decodable by each of the plurality of mobile electronic devices receiving the broadcast and wherein the private messages within the broadcast are decodable only by a single electronic device receiving the broadcast; wherein the broadcast movie content comprises; a top 10 list of current movies having the ten highest revenues for a week; movie names, movie theatre names, ratings and genres; and wherein the movie channel content is broadcast more frequently during a weekend as compared to weekdays;
 a display;
 a user interface that includes a selector; and
 an electronic system that is arranged to interact with the user interface, the data store, the communication connection, and the display, wherein the electronic system is configured to:
  select a current operating mode when a movie channel is activated;
  filter the movie content based on pre-defined user preferences ; wherein the pre-defined user preferences include determining when there is a designation of: a selection of movie theatres; a selection of movie genre preferences; a selection of ratings; a selection of movie theatres within a designated area; a selection of actors; and a selection of directors; wherein the filtering is based on the pre-defined preferences and is automatically performed on the electronic device after the movie channel content has been received on the electronic device and wherein the filtering creates personalized content on the apparatus; wherein the pre-defined user preferences are received on the mobile electronic device through one or more private messages received through the broadcast and wherein the received pre-defined preferences are stored on the mobile electronic device after being received through the one more private messages;

decoding the received records; wherein decoding the received records includes associating an index value with an expanded name when one of the records is encoded as an index; wherein theatre names are encoded as an index;

change the current operating mode in response to the selector;

select a current view that is associated with the current operating mode; and display the current view on the display.

11. The apparatus of claim 10, wherein the electronic system is further configured to activate a list browser in response to the selector when one of the operating modes is active.

12. The apparatus of claim 11, wherein the electronic system is further configured to activate a movie list in response to the interface selection device when a movie mode is active, wherein the movie list is organized as a list of movies that are currently showing at theaters based on the pre-defined user preferences, and wherein the selector is configured for selecting one of the movies in the list.

13. The apparatus of claim 12, wherein the electronic system is further configured to set the current view to show at least one of: show times and theaters currently playing the selected movie.

14. The apparatus of claim 11, wherein the electronic system is further configured to activate a theater list in response to the interface selection device when a theater mode is active, wherein the theater list is organized as a list of theaters, movie times, and ratings, and wherein the selector is configured for selecting one of the theaters in the list.

15. The apparatus of claim 14, wherein the electronic system is further configured to set the current view to show at least one of: show times and movies currently playing the selected theater.

16. The apparatus of claim 14, further comprising adjusting the list of theaters based on user preferences.

17. The apparatus of claim 14, further comprising adjusting the list of theaters based on a location associated with the apparatus.

18. The apparatus of claim 11, wherein the electronic system is further configured to activate a top 10 list in response to the interface selection device when a top 10 mode is active, wherein the top 10 list is organized as a list of movies, and wherein the selector is configured for selecting one of the movies in the list.

19. The apparatus of claim 18, wherein the electronic system is further configured to set the current view to show at least one of: ranking and earnings associated with the selected movie.

20. A system for providing and interacting with movie content associated with a movie channel, comprising:

a data collector configured to collect the movie content associated with the movie channel; wherein the movie content comprises: a top 10 list of current movies having the ten highest revenues for a week; movie names, movie theatre names, ratings and genres;

a broadcast device configured to automatically broadcast a communication signal including the movie content to a plurality of mobile electronic devices at the same time; wherein the movie content is not personalized when it is broadcast; wherein the movie content is received as records; wherein the broadcast transmission includes public messages and private messages; wherein the public messages are decodable by each of the many electronic devices receiving the broadcast and where in the private messages within the broadcast are decodable only by a single electronic device receiving the broadcast;

a mobile electronic device, having:

a data store;

a communication connection configured to automatically receive the broadcast communication signal and store the movie content in the data store;

a display;

a user interface that includes a selector; and an electronic system that is arranged to interact with the communication connection, the user interface, the data store and the display, wherein the electronic system is configured to:

filter the movie content based on pre-defined user preferences: wherein the pre-defined user preferences include determining when there is a designation of: a selection of movie theatres: a selection of movie genre preferences: a selection of ratings: a selection of movie theatres within a designated area: a selection of actors: and a selection of directors: wherein the filtering is based on the pre-defined preferences and is automatically performed on the electronic device after the movie channel content has been received on the electronic device and wherein the filtering creates personalized content on the apparatus: wherein the pre-defined user preferences are received on the mobile electronic device through one or more private messages received through the broadcast and wherein the received pre-defined preferences are stored on the mobile electronic device after being received through the one more private messages;

decode the received records; wherein decoding the received records includes associating an index value with an expanded name when one of the records is encoded as an index; wherein theatre names are encoded as an index;

select a current view associated with the movie channel;

change the current view in response to the selector; and display the current view on the display.

21. The system of claim 20, wherein the movie content includes: currently playing movies; theaters associated with a user of the mobile electronic device; show times; ratings; reviews; earnings, director, genre, running time, actors, and actresses.

22. The system of claim 21 wherein the electronic system is further configured to a detailed view associated with at least one of: a selected movie and a selected theater.

23. The system of claim 20 wherein the broadcast device is configured to broadcast an FM communication signal.

24. The system of claim 20, further comprising a server configured to receive user preferences associated with users receiving the movie channel; wherein the user preferences include preferences related to at least one of the following: preferred theaters and ratings.

25. The system of claim 20, wherein the broadcast device is further configured to send theater names as part of a configuration message.

26. The system of claim 25, wherein the broadcast device is configured to broadcast movie names in one stream and movie times in another stream.

27. The system of claim 20, wherein the broadcast device is further configured to determine and transmit only the movie content that relates to a particular region.

28. The system of claim 27, wherein the broadcast device broadcasts theater information, movie information, and show time information associated with the region.

29. The system of claim 28, wherein the mobile electronic device is further configured to store only the movie content that matches at least one preference associated with the device.

30. The system of claim 20, wherein the broadcast device is further configured to broadcast at least one of the following streams: a stream information (SI) stream that provides location and change tracking information; a theater names (TN) stream that provides the names of theaters in a region; a movie names (MN) stream that provides names of available movies in the region; and a show times (ST) stream that provides show times for the available movies.

31. The system of claim 30, wherein the SI stream includes a table of content version that includes information about other streams, wherein the table of content version changes when there is a change in a name of at least one of a movie and a theater.

32. The system of claim 31, wherein the communication connection of the mobile electronic device is further configured to receive the SI stream and further comprises an application that is configured to determine packets of interest to the device.

33. The system of claim 30, further comprising maintaining an array of IDs that relate to the theaters in a region.

34. The system of claim 30, further comprising broadcasting a show time and providing the other show times by an offset relative to the show time.

35. The system of claim 30, wherein the broadcast device is further configured to broadcast a packet description including: an identifier that identifies the stream; a packet index indicating a packet; and at least one marker that indicates at least one of a starting point and an ending point.

36. The system of claim 30, wherein the MN stream includes a rating for each of the available movies in the region.

* * * * *